US012640299B2

(12) United States Patent
Klesyk et al.

(10) Patent No.: US 12,640,299 B2
(45) Date of Patent: May 26, 2026

(54) ELECTRONIC COMPONENT AND METHODS RELATING TO SAME

(71) Applicant: Coilcraft, Incorporated, Cary, IL (US)

(72) Inventors: Andrew Klesyk, Lake in the Hills, IL (US); Lawrence B. Lestarge, Algonquin, IL (US); Scott Hess, Crystal Lake, IL (US); Hyeonchul Park, Mount Prospect, IL (US)

(73) Assignee: Coilcraft, Incorporated, Cary, IL (US)

(*) Notice: Subject to any disclaimer, the term of this patent is extended or adjusted under 35 U.S.C. 154(b) by 629 days.

(21) Appl. No.: 18/097,076

(22) Filed: Jan. 13, 2023

(65) Prior Publication Data

US 2023/0230744 A1 Jul. 20, 2023

Related U.S. Application Data

(60) Provisional application No. 63/299,508, filed on Jan. 14, 2022.

(51) Int. Cl.
*H01F 27/00* (2006.01)
*H01F 27/02* (2006.01)
(Continued)

(52) U.S. Cl.
CPC ......... *H01F 27/006* (2013.01); *H01F 27/022* (2013.01); *H01F 27/06* (2013.01);
(Continued)

(58) Field of Classification Search
CPC ...... H01F 27/006; H01F 27/022; H01F 27/06; H01F 27/2823; H01F 27/323; H01F 2027/065
See application file for complete search history.

(56) References Cited

U.S. PATENT DOCUMENTS

| | | | |
|---|---|---|---|
| 734,310 | A | 7/1903 | Hermann |
| D82,369 | S | 10/1930 | Cafiero |

(Continued)

FOREIGN PATENT DOCUMENTS

| | | |
|---|---|---|
| CN | 108987066 | 12/2018 |
| WO | 2021213801 | 10/2021 |

OTHER PUBLICATIONS

Patent Cooperation Treaty, International Searching Authority, Notification of Transmittal of the International Search Report and the Written Opinion of the International Searching Authority, or the Declaration, issued in International Application No. PCT/US2023/010809, May 12, 2023, 11 pp.

(Continued)

*Primary Examiner* — Malcolm Barnes
(74) *Attorney, Agent, or Firm* — Fitch, Even, Tabin & Flannery LLP

(57) ABSTRACT

An electronic component, such as, for example, a transformer, includes a core, a first wire, and a second wire. The first wire is wound at least in part about at least a portion of the core in a first winding. The second wire is wound at least in part about at least a portion of the core in a second winding such that the first winding and the second winding alternate at least in part along at least a portion of the core. The electronic component includes windings that are intertwined about the core to form an intertwined spiral winding. Such a configuration can both improve electrical characteristics of the electronic component while reducing a height of the electronic component. Further, methods of manufacturing such components and customizing same are disclosed.

35 Claims, 15 Drawing Sheets

(51) Int. Cl.
*H01F 27/06* (2006.01)
*H01F 27/28* (2006.01)
*H01F 27/32* (2006.01)

(52) U.S. Cl.
CPC ....... *H01F 27/2823* (2013.01); *H01F 27/323* (2013.01); *H01F 2027/065* (2013.01)

(56) References Cited

U.S. PATENT DOCUMENTS

| | | | | |
|---|---|---|---|---|
| 2,195,233 | A | 3/1940 | Boyer | |
| 3,260,792 | A | 7/1966 | Kreisel | |
| D227,255 | S | 6/1973 | Willian et al. | |
| 4,901,048 | A * | 2/1990 | Williamson | H01F 30/16 336/229 |
| D357,227 | S | 4/1995 | Smithers | |
| D522,849 | S | 6/2006 | Dick | |
| D528,515 | S | 9/2006 | Sumitani | |
| D587,221 | S | 2/2009 | Tokuda | |
| D624,886 | S | 10/2010 | Ni | |
| D632,267 | S | 2/2011 | Chen | |
| D659,654 | S | 5/2012 | Wang | |
| D668,233 | S | 10/2012 | Huang | |
| D712,355 | S | 9/2014 | Nakamura | |
| D818,442 | S | 5/2018 | Saitou | |
| D951,203 | S | 5/2022 | Kim | |
| D974,311 | S | 1/2023 | Kondo | |
| D975,666 | S | 1/2023 | Kondo | |
| 11,658,275 | B2 | 5/2023 | Jang | |
| 12,016,704 | B2 | 6/2024 | Spring | |
| 12,308,151 | B2 * | 5/2025 | Liu | H01F 27/2828 |
| 2003/0052767 | A1 | 3/2003 | Yamanobe | |
| 2003/0201863 | A1 * | 10/2003 | Chung | H01F 27/324 336/200 |
| 2004/0124950 | A1 * | 7/2004 | Hsu | H01F 27/027 333/185 |
| 2004/0171301 | A1 | 9/2004 | Jonsson | |
| 2005/0236236 | A1 | 10/2005 | Farooq | |
| 2005/0269589 | A1 | 12/2005 | Wu | |
| 2007/0216512 | A1 * | 9/2007 | Sano | H01F 17/043 336/212 |
| 2009/0142145 | A1 | 6/2009 | Martin | |
| 2009/0289751 | A1 * | 11/2009 | Nagano | H02M 3/1584 336/221 |
| 2010/0289610 | A1 * | 11/2010 | Jacobson | H01F 27/2885 336/84 C |
| 2011/0005064 | A1 * | 1/2011 | Klesyk | H01F 27/32 29/605 |
| 2012/0176214 | A1 * | 7/2012 | Hsiao | H01F 27/2823 336/183 |
| 2013/0153191 | A1 | 6/2013 | Compton | |
| 2014/0002227 | A1 * | 1/2014 | Hsieh | H01F 5/003 336/200 |
| 2014/0097921 | A1 * | 4/2014 | Ohtsubo | H01F 27/29 336/83 |
| 2014/0335714 | A1 | 11/2014 | Schrader | |
| 2015/0069901 | A1 | 3/2015 | Talavera González | |
| 2016/0086725 | A1 * | 3/2016 | Igarashi | H01F 27/2823 336/83 |
| 2016/0148741 | A1 | 5/2016 | Kitamura | |
| 2017/0125157 | A1 | 5/2017 | Hess | |
| 2018/0048082 | A1 | 2/2018 | Sabo | |
| 2018/0122552 | A1 | 5/2018 | Sakaguchi | |
| 2018/0308615 | A1 | 10/2018 | Tsai | |
| 2019/0140380 | A1 | 5/2019 | Chen | |
| 2019/0156977 | A1 | 5/2019 | Jung | |
| 2019/0287707 | A1 | 9/2019 | Klesyk | |
| 2020/0152374 | A1 * | 5/2020 | Sato | H01F 27/2823 |
| 2020/0294709 | A1 * | 9/2020 | Kim | H01F 27/292 |
| 2020/0411223 | A1 | 12/2020 | Satou | |
| 2022/0165475 | A1 | 5/2022 | Tsai | |
| 2023/0170118 | A1 * | 6/2023 | Yoon | H01F 5/06 336/225 |
| 2023/0230753 | A1 | 7/2023 | Klesyk | |

OTHER PUBLICATIONS

Patent Cooperation Treaty, International Searching Authority, Notification of Transmittal of the International Search Report and the Written Opinion of the International Searching Authority, or the Declaration, issued in International Application No. PCT/US2023/010816, May 15, 2023, 9 pp.

* cited by examiner

ELECTRONIC COMPONENT AND METHODS RELATING TO SAME

CROSS-REFERENCE TO RELATED APPLICATIONS

This application claims priority to U.S. Provisional Application No. 63/299,508, filed Jan. 14, 2022, and is incorporated herein by reference in its entirety.

FIELD OF THE INVENTION

This invention relates generally to electronic components and more particularly concerns magnetics, such as surface mountable transformer components, having a structure and composition that minimizes the height thereof and methods relating to same.

BACKGROUND

The electronics industry is continually called upon to make products smaller and more powerful. Applications such as mobile phones, portable computers, computer accessories, hand-held electronics, etc., create a large demand for smaller electrical components. These applications further drive technology and promote the research of new areas and ideas with respect to miniaturizing electronics. The technology is often limited due to the inability to make certain components smaller, faster, and more powerful.

Magnetic components, such as transformers, are examples of the type of components that have been forced to become smaller and/or more powerful. Typical transformers often comprise a pair of wires wound or coiled about a core of magnetic material, such as ferrite, with the ends of each wire connected to or forming respective terminals for mounting the component into an electronic circuit of some type, usually on a printed circuit board. The core and the coils each occupy substantial space both in height and surface footprint. Typically, as the coupling, induction, and power handling of a transformer increases or otherwise improves, the footprint and/or the height of the transformer also increases, often beyond the allowable space allocated for such a transformer within the form factor of an electronic device utilizing the transformer. However, as electronic devices, such as mobile telephones, smart phones, PDAs, and other portable electronic devices, become smaller, less space is allowed for such transformers while at the same time the performance required by such transformers often increases.

Accordingly, it has been determined that the need exists for an improved transformer component and method for manufacturing the same which overcomes the aforementioned limitations, and which further provide capabilities, features and functions, not available in current devices and methods for manufacturing.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an electronic component (i.e., a transformer) comprises a core having two conductors wound around a portion of the core to form an intertwined spiral winding. The electronic component may further include terminals connected to or formed by the ends of the two conductors for electrically coupling the electronic component into at least one circuit.

Figure 1:
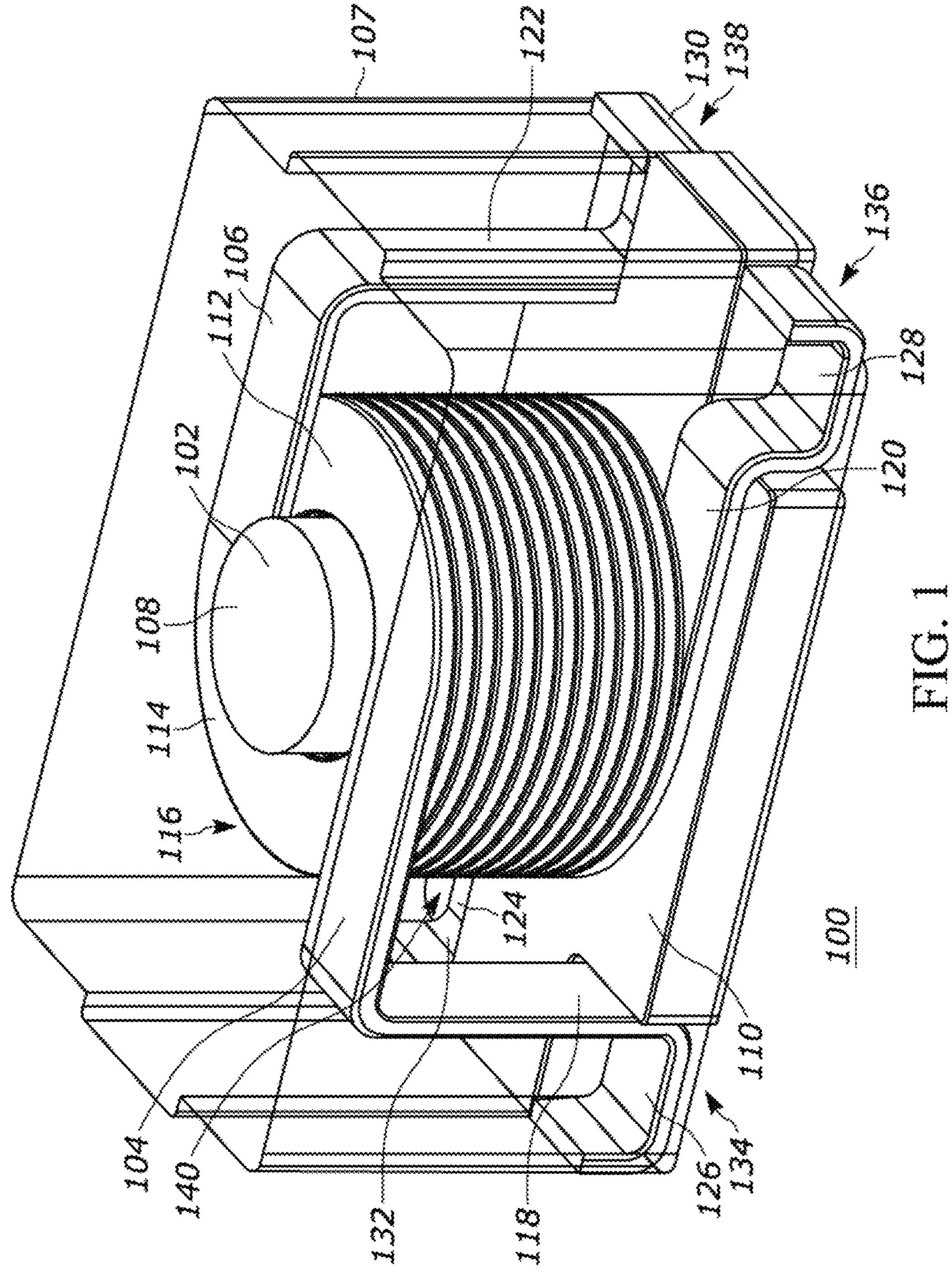
FIG. 1 is a perspective view of an electronic component in accordance with various embodiments.

Referring now to the drawings, and in particular to FIG. 1, an electronic component 100 is illustrated in accordance with various approaches. The electronic component 100 includes a core 102 (preferably a tack core 102), a first conductor 104, and a second conductor 106. The core 102 preferably comprises a ferrite material, although a number of other conventional core materials may be used. The component 100 may further include an outer body 107 disposed about at least a portion of the core 102 and first and second conductors 104, 106.

In the embodiment shown in FIG. 1, the core 102 comprises a tack core 102 and includes an elongated member 108 comprising a column, post, or other longitudinal protrusion, and a base or flanged portion 110. The elongated member 108 is generally centrally located with respect to the flanged portion 110 and extends from an upper surface thereof. The elongated member 108 typically has a cylindrical cross-section, as shown, although other cross-sections are contemplated, such as for example a generally hexagonal cross-section or, alternatively, other polygonal shaped cross-sections. Although described as "elongated," by certain approaches, the elongated member 108 may have a diameter that exceeds its height in the longitudinal direction.

The first conductor 104 and the second conductor 106 are each configured in a coil or winding 112, 114 around at least a portion of the elongated member 108 of the core 102. The two coils or windings 112, 114 are intertwined, interlocked, interleaved, screwed or meshed together to form combined spiral windings 116 around the portion of the elongated member 108. The intertwined spiral windings 116 are coaxial to each other and together have a central axis that is coaxial to and/or substantially parallel to the longitudinal axis of the elongated member 108 of the core 102 (i.e., within 10% to account for manufacturing tolerances). In a preferred approach, the central axis of the intertwined spiral windings 116 is approximately the same as the central longitudinal axis of the elongated portion 108 (so that the intertwined spiral windings 116 are substantially centered on the elongated member 108 of the core 102).

In a preferred embodiment, the first and second conductors 104, 106 are each a flat wire 104, 106 or a ribbon wire having a cross-sectional width (i.e., horizontally) that is larger than the cross-sectional thickness (i.e., vertically). By one embodiment, the width of the flat wire 104, 106 can be as little as approximately 0.6 mm and as wide as approximately 4 mm, with a more specific range of approximately 1 mm to 2.2 mm. The thickness of the flat wire 104, 106 can be as large as approximately 0.6 mm to as thin as 0.05 mm, with a more specific range of approximately 0.07 mm to 0.3 mm. Any individual value or other range or ranges within these disclosed ranges may be appropriate for the width and thickness dependent on the requirements of a given application. In some forms, the finished component is rectangular or generally rectangular. In many forms, it will be desired to make the size of the finished component 100 square or generally square, thus, for example, finished parts may come in sizes such as 2 $mm^2$, 3 $mm^2$, 4 $mm^2$, 5 $mm^2$, 6 $mm^2$, etc.

Figure 2:
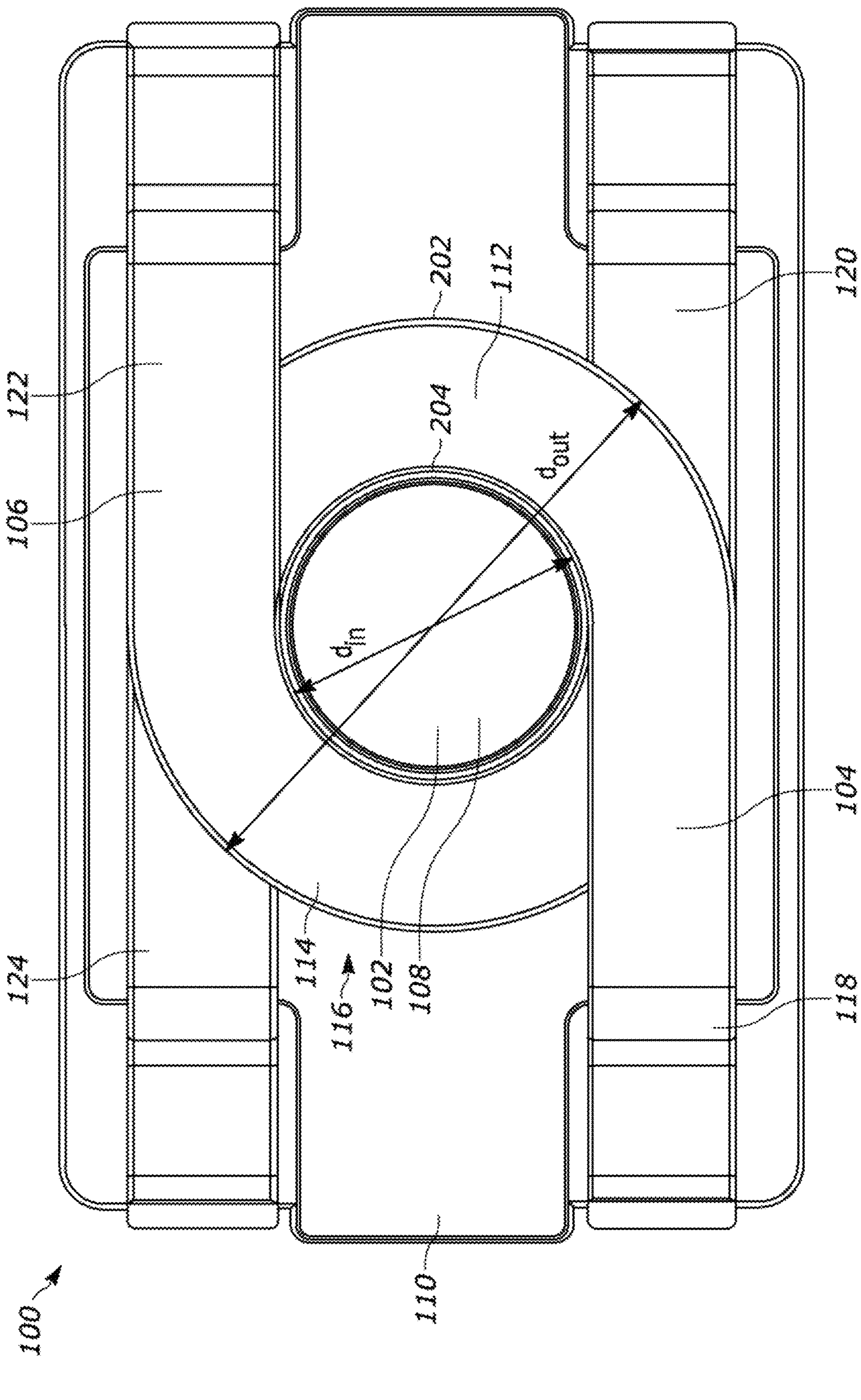
FIG. 2 is a top elevational view of the electronic component of FIG. 1.

The first and second flat wires 104, 106 are each edge-wound to form a first edge-wound winding 112 and a second edge-wound winding 114, respectively. As is shown in FIG. 1, an edge-wound winding 112, 114 is formed from the flat wire 104, 106 being coiled in a helical fashion about the core 102 (or another assembly) such that the bending moment of the flat wire 104, 106 exists primarily and substantially along the width-wise axis of the flat wire 104, 106 (being the wider axis of the cross section of the flat wire 104, 106 and not to be confused with the thickness-wise axis, being the narrower axis extending from the top flat surface 308 to the bottom flat surface 314 (see FIG. 3) of the flat wire 104, 106). When such bending moment is applied during configuration of the flat wires 104, 106 into the first and second edge-wound windings 112, 114, an inner diameter $d_{in}$ and an outer diameter $d_{out}$ of each edge-wound winding 112, 114 are formed. With reference now to FIG. 2, which illustrates a top view of the electronic component 100, the inner diameter $d_{in}$ and outer diameter $d_{out}$ are shown, wherein the inner diameter $d_{in}$ is smaller than the outer diameter $d_{out}$. By one approach, the inner diameter $d_{in}$ and outer diameter $d_{out}$ remain constant throughout the intertwined spiral windings 116. The diameters $d_{in}$, $d_{out}$ will typically intersect the center axis of the edge-wound windings 112, 114, which also often coincides with the center axis of the elongated member 108 of the core 102. By one approach, the inner diameter $d_{in}$ includes a range of approximately 0.8 mm to approximately 10 mm, and by a more specific approach, approximately 0.8 mm to 5 mm, with a preferred inner diameter $d_{in}$ of approximately 0.8 mm to 4.4 mm. The outer diameter $d_{out}$ includes a range of approximately 1.4 mm to as high as 22 mm, any by a more specific approach, approximately 1.4 mm to 10 mm, with a preferred outer diameter $d_{out}$ of approximately 9 mm. Any individual value or other range or ranges within these disclosed ranges may be appropriate for the inner diameter $d_{in}$ and outer diameter $d_{out}$ dependent on the requirements of a given application. To achieve higher inductances, the diameter of the elongate member 108 may be increased such that the $d_{in}$ of the intertwined spiral windings 116 is increased. Smaller and thinner wire 104, 106 may also be used to achieve higher inductances.

With continuing reference to FIG. 2, during the edge-winding process, the length of the outer edge 202 of the flat wire 104, 106, as corresponds to the outer diameter $d_{out}$, typically lengthens as compared to its pre-wound length to accommodate for the change in shape. Typically, the outer edge 202 can lengthen to as much as two to three times its original pre-wound length, with the outer edge 202 length of the embodiment illustrated here being approximately 2.5 times the original pre-wound length. The lengthening effect exists in a gradient along the width-wise axis of the flat wire 104, 106, with such lengthening effect lessening across the width-wise axis moving inward. The inner edge 204, as indicated by the inner diameter $d_{in}$, typically remains approximately the same as its original pre-wound length, though by some approaches the length of the inner edge 204 may actually shorten under the stress of the bending moment.

To form the first and second flat wires 104, 106 into the first and second edge-wound windings 112, 114 that make up the intertwined spiral windings 116, the flat wires 104, 106 may be edge-wound directly onto and around the elongated member 108 of the core 102. By another embodiment, the flat wires 104, 106 may be edge-wound around a tool comprising a shaft or other elongated member of the approximate inner diameter $d_{in}$ desired (which may correspond directly to the diameter of the elongated member 108). By this, the intertwined spiral windings 116 are formed free of the core 102 and can later be placed around a core 102 or a core 102 can be formed therein. By a different approach, the flat wires 104, 106 may be shaped into the edge-wound windings 112, 114 by means of a channel guide, as is typical in the manufacturing of springs. Other known and unknown methods of edge-winding flat wire may be equally useful.

By one approach, to intertwine the first and second edge-wound windings 112, 114 into the intertwined spiral windings 116, each of the first and second flat wires 104, 106 are simultaneously edge-wound on the same core 102 (or tool) or simultaneously channel formed so that they are formed integral to each other. For example, a turn of the first wire 104 is formed with a turn of the second wire 106 formed above the turn of the first wire 104 before a second turn of the first wire 104 is formed above the first turn of the second wire 106 and so on. For instance, turns of the second wire 106 may be formed simultaneously with the first wire 104 by trailing behind the first wire 104 (e.g., 180 degrees behind) in a helical fashion along the core 102 or other assembly. In another approach, each individual edge-wound winding 112, 114 may be formed independent of each other and then joined to form the intertwined spiral windings 116, for example, by screwing one edge-wound winding into the other along each of their central longitudinal axes. By yet another approach, the first and second edge-wound windings 112, 114 can be formed in serial so that the first 112 is formed independent of the second 114 and then the second flat wire 106 is edge-wound in an intertwining manner onto a same core 102 (or tool) that the first edge-wound winding 112 is on (i.e., by filling in the spaces between individual turns 302, 304 (see FIG. 3) of the second edge-wound winding 114 with individual turns of the first edge-wound winding 112).

Figure 3:
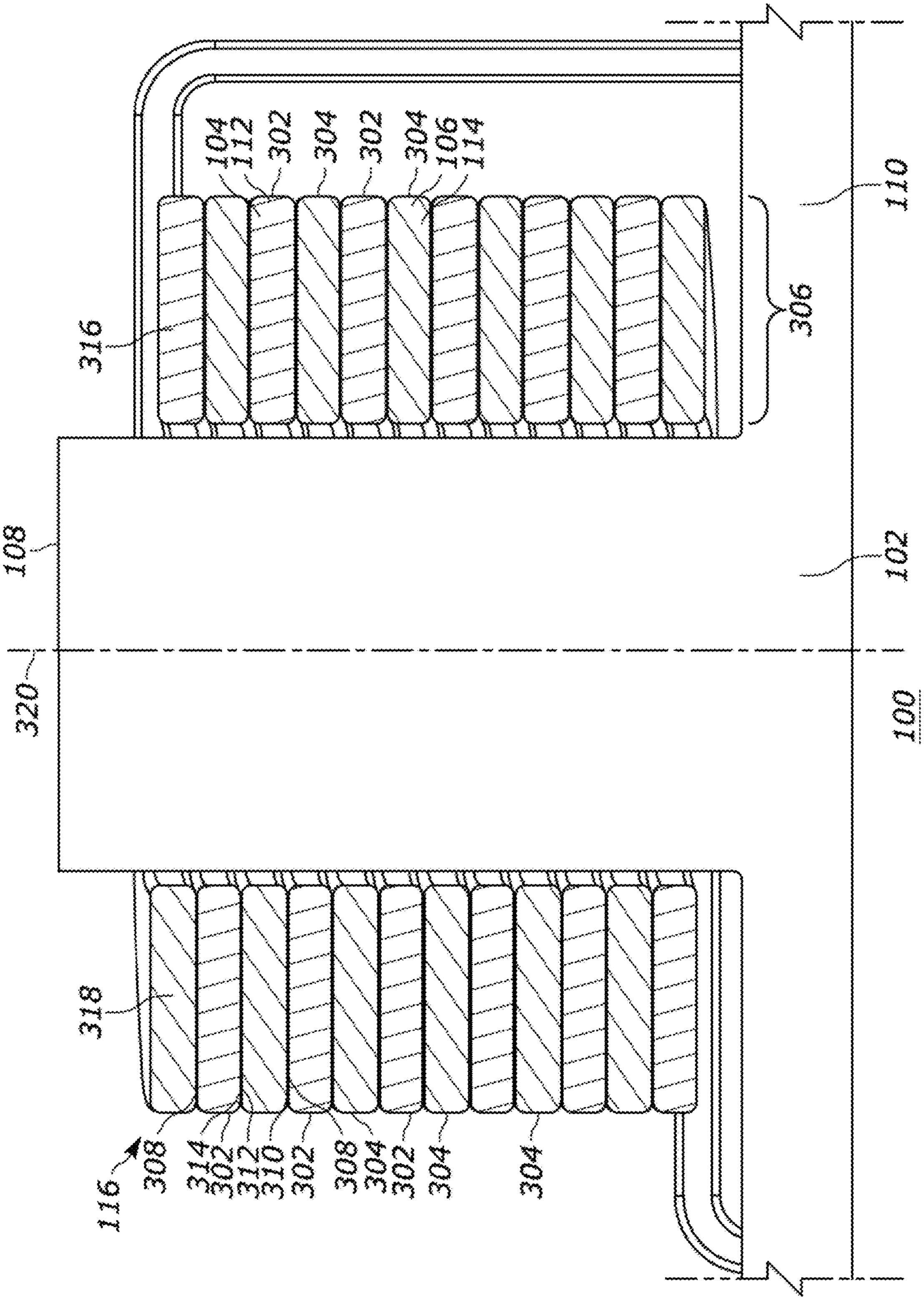
FIG. 3 is a sectional view showing the electronic component of FIG. 1 with pertinent portions thereof cut away.

Turning now to FIG. 3, a sectional view shows the electronic component 100 with the intertwining spiral windings 116 being cut away along the center of the electronic component 100. FIG. 3 shows the core 102 having the elongated member 108 and the intertwining spiral windings 116 configured about the elongated member 108. The cutaways of each turn 302 of the first edge-wound winding 112 is indicated by a first hatch pattern and the cutaways of each turn 304 of the second edge-wound winding 114 is indicated by a second hatch pattern. By one embodiment, as is indicated in FIG. 3, a sidewall 306 of the intertwined spiral windings 116 is made of alternating turns 302, 304 of the first edge-wound winding 112 and the second-edge wound winding 114. In this embodiment, the first and second edge-wound windings 112, 114 each comprise the same number of turns 302, 304, forming a transformer with a 1:1 winding ratio. Further, in this embodiment, the alternating turns 302, 304 are substantially adjacent to each other leaving little to no space between individual turns 302, 304 of each edge-wound winding 112, 114. Elimination of this space between the turns 302, 304 decreases the height 512 (see FIG. 5) of the electronic component 100 and helps improve coupling between the first and second edge-wound windings 112, 114. As shown in FIG. 1, a majority of the individual turns 302 of the first edge-wound winding 112 are adjacent to individual turns 304 of the second edge-wound winding 114 and are not adjacent to other individual turns 302 of the first edge-wound winding 112 throughout the intertwined spiral windings 116.

In this configuration, flat surfaces 308, 310, 312, 314 of adjacent portions or turns 302, 304 of the first and second flat wires 104, 106 within the intertwined spiral windings 116 will be substantially parallel to each other, as is shown in FIG. 3. For example, the turns 302, 304 of the first and second edge-wound windings 112, 114 can be stacked one upon each other within the intertwined spiral winding 116. By this, a top surface of one flat wire (i.e., the top surface 308 first flat wire 104 of the first edge-wound winding 112) faces the bottom surface of the other flat wire (i.e., the bottom surface 310 of the second flat wire 106 of the second edge-wound winding 114) at least through a majority of the turns 302, 304 of the intertwined spiral windings 116. Note that, in the embodiment illustrated, a portion of the top surface 308, 312 of each top turn 316, 318 of each winding 112, 114 may not have another turn stacked thereupon (with corresponding bottom surface 310, 314). Further, by another approach, these flat surfaces 308, 310, 312, 314 may be substantially perpendicular to the longitudinal axis 320 of the elongated member 108 of the core 102 (i.e., within 10-15% to account for manufacturing tolerances).

By edge-winding and intertwining the edge-wound windings 112, 114 as described herein, the amount of surface area of one flat wire (i.e., the top surface 308 or bottom surface 314 of the first flat wire 104) that is adjacent to the surface area of the other flat wire (i.e., the top surface 312 or bottom surface 312 of the second flat wire 106) is maximized. This helps to improve electronic coupling therebetween, coupling being a key electrical aspect of a transformer. This improved coupling is also achieved without unnecessarily increasing the height 512 of the electronic component 100 as this improved coupling occurs primarily by operation of the increased overlapping widths of the flat wires 104, 106. By keeping the thickness (i.e., height) of each turn 302, 304 of the intertwined spiral windings 116 to a minimum, the height 512 is kept to a minimum as well. For example, by one approach, the electronic component 100 is configured such that its height 512 along the longitudinal axis 320 of the elongated member 108 (or the central axis of the intertwined spiral windings 116) is between approximately 0.6 mm and 30 mm. By another approach, the height 512 is between approximately 6 mm and 14 mm, with a preferred height 512 according to the illustrated embodiments of approximately 6 mm. However, other individual heights 512 or ranges of heights 512 within the disclosed height ranges are fully contemplated and will be dictated by various requirements of the electronic component 100 in a given circuit.

These teachings are highly scalable in that alternative embodiments comprising winding ratios other than 1:1 are possible. Though a winding ratio of 1:1 is shown and used, for example, for isolation transformers, the intertwining spiral windings 116 may be configured in other ratios such as 1:5, or even higher (without a theoretical upper bound). To achieve alternative winding ratios, much like above, the intertwining spiral windings 116 may be configured so that individual turns 302 of the first edge-wound winding 112 are uniformly inserted between individual turns 304 of the second edge-wound winding 114. Though the 1:1 ratio embodiments discussed above involved inserting the turns 302, 304 in an alternating pattern (i.e., one turn 302 from the first winding 112, then one turn 304 from the second winding 114, and so forth), these non-alternating embodiments may include inserting individual turns 302 of the first edge-wound winding 112 between sets of turns 304 of the second edge-wound winding 114. For example, in a 1:3 ratio example, individual turns 302 of the first winding 112 may exist between sets of three turns 304 of the second winding 114. The first flat wire 104 of the first edge-wound winding 112 jumps or extends over sets of three turns 304 of the second winding 114 upon every turn 302. This may possibly be achieved with a portion of the first edge-wound winding 112 that extends substantially parallel to the longitudinal axis 320 of the elongated member 108 of the core 102 on the inside or outside of the sidewall 306 of the intertwined spiral windings 116. Alternatively still, to avoid jumping upon every turn 302 of the first winding 112, individual turns 302, 304 of the first and second windings 112, 114 can alternate for a portion, and then the first flat wire 104 of the first winding 112 can make a single larger jump. For example, and continuing with the 1:3 ratio example, the first and second windings 112, 114 can be intertwined in a 1:1 as discussed above for, for example, ten turns each, and then the first winding 112 can jump twenty turns 304 of the second winding 114. Thus, for every ten turns 302 of the first winding 112, thirty turns 304 of the second winding 114 have been achieved while minimizing the number of jumps by the first winding 112. Other variations are possible to achieve varying ratios and performance specifications. Further, the total number of turns 302, 304 in the example transformer is scalable as well and can be as low as a half of a turn for each winding without a theoretical upper bound on number of turns 302, 304.

Figure 4:
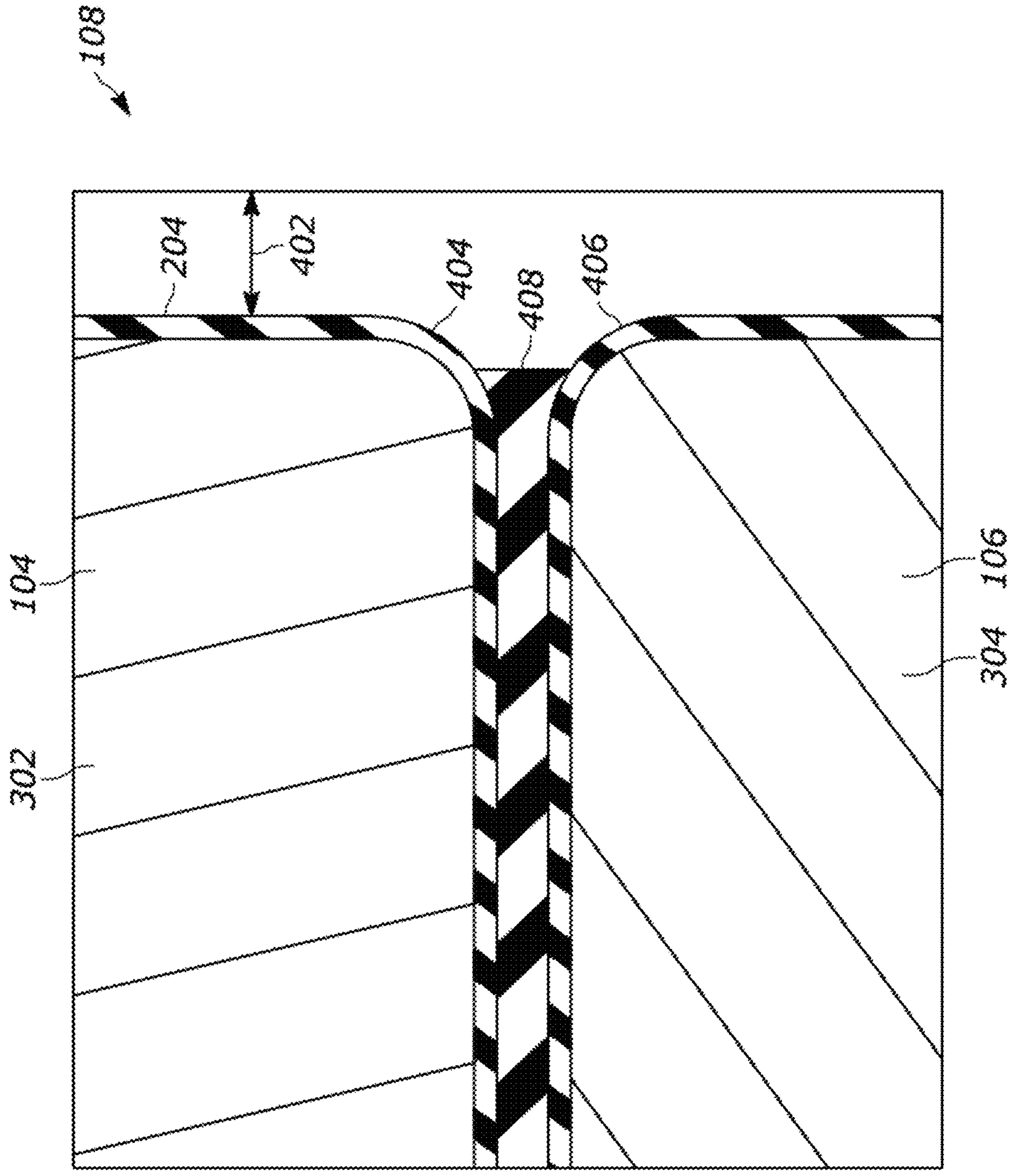
FIG. 4 is an enlarged version of a portion of FIG. 3.

Turning now to FIG. 4, an enlarged version of a portion of FIG. 3 is shown illustrating further details of the first and second flat wires 104, 106 within the intertwined spiral windings 116. Illustrated is a cross section of the first and second flat wires 104, 106 having been edge-wound around the core 102. As shown here, a slight gap 402 may exist between the inner edge 204 of the flat wires 104, 106 and the core 102, though other approaches will minimize or eliminate the gap 402. By one approach, the first and second flat wires 104, 106 are each insulated with a coating or jacket of wire insulation 404, 406. In a preferred embodiment, the jacket of wire insulation 404, 406 is made of modified polyurethane, polyesterimide, nylons, or any combination thereof, but other suitable insulation materials are fully contemplated, including modified polyurethane with a polyamide overcoat, theic-modified polyesterimide, polyamidimide, A200 with polyamidimide, polyimide, and various enamels and varnishes, to name a few. The insulation jackets 404, 406 of the first and second flat wires 104, 106 may be the same or a combination of different insulation materials.

By another approach, and particularly in high-voltage applications, an additional layer of dielectric insulation 408 may be provided between each individual turn 302, 304 that is external to the insulation jackets 404, 406 of the first and second flat wires 104, 106, as is shown in FIG. 4. The optional additional insulation layer 408 may be a single or double sided tape, a varnish, a potting compound, a doping compound, or any of the above mentioned insulation materials, as well as other suitable dielectric materials. Often, this optional additional insulation layer 408 may be a different dielectric insulator from the insulation jackets 404, 406 of the first and second flat wires 104, 106, though they may be the same by some approaches.

The electronic component 100 may be used for a wide range of voltage levels, for example, the component may have a voltage rating in a range of about 10 Volts to about 200 Volts and, more specifically, in the range of 20 Volts to about 150 Volts.

Returning to FIG. 1, the first flat wire 104 has a first 118 and second end 124 and the second flat wire 106 has a first 122 and second end 120. By one approach, the component 100 comprises exposed terminals 126, 128, 130, 132 that are formed by respective first and second ends 118, 120, 122, 124 of the first and second flat wires 104, 106 (e.g., self-leaded), though other configurations are possible. By other approaches, the first and second ends 118, 120, 122, 124 of the first and second flat wires 104, 106 are coupled to separate exposed terminals (not shown), possibly comprising metalized pads formed by applying a heat-curable thick film to various portions of the bottom surface 508 and/or edges 504 of the core 102. Other alternative embodiments include attaching terminal lead frames, such as mechanical conductive clip type terminals, to the flange portion 110 of the tack core 102 and/or the outer body 107. The terminals 126, 128, 130, 132 may be used to electrically and mechanically couple the component 100 to a PCB.

Figure 5:
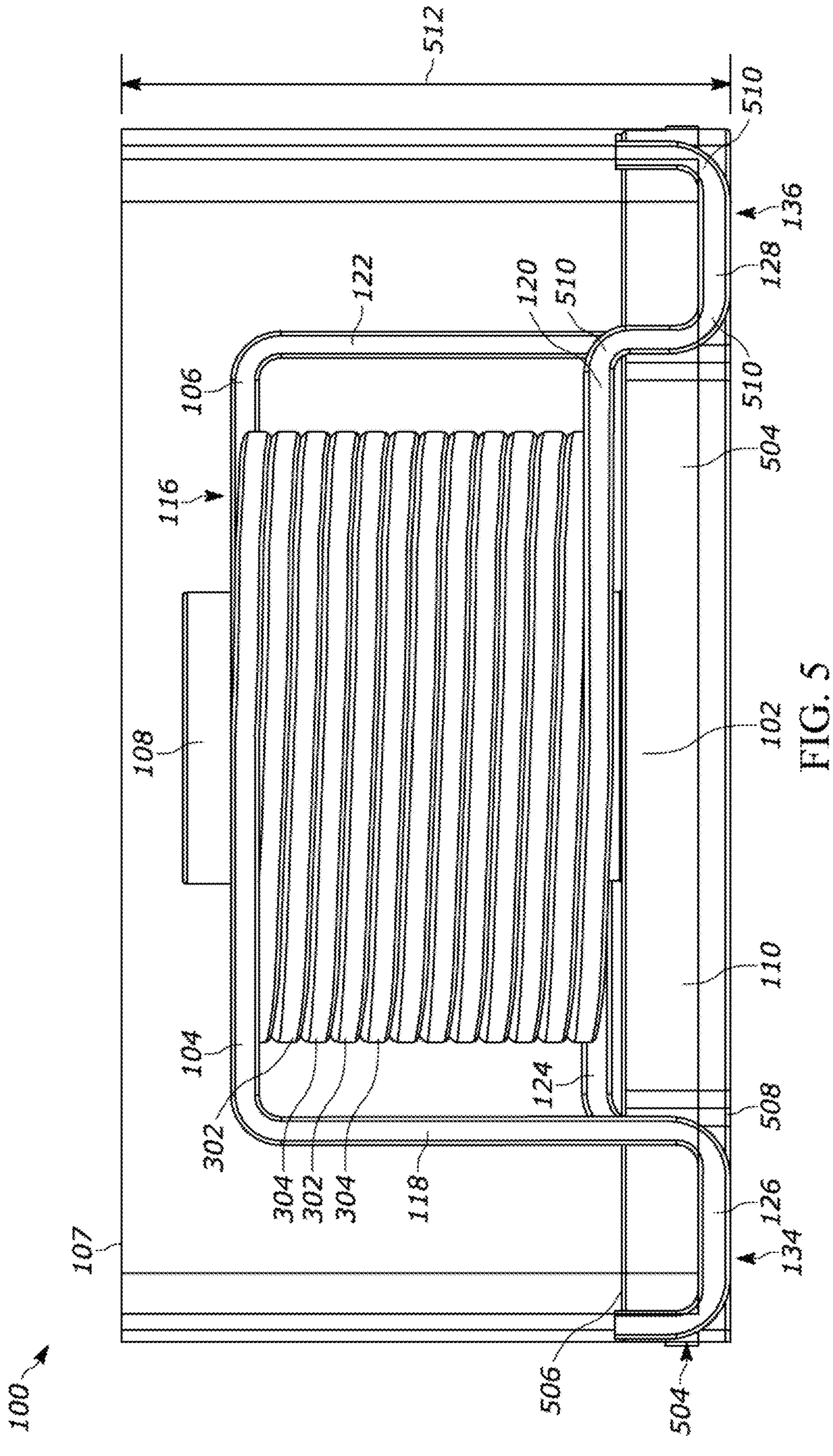
FIG. 5 is a side elevational view of the electronic component of FIG. 1.
Figure 6:
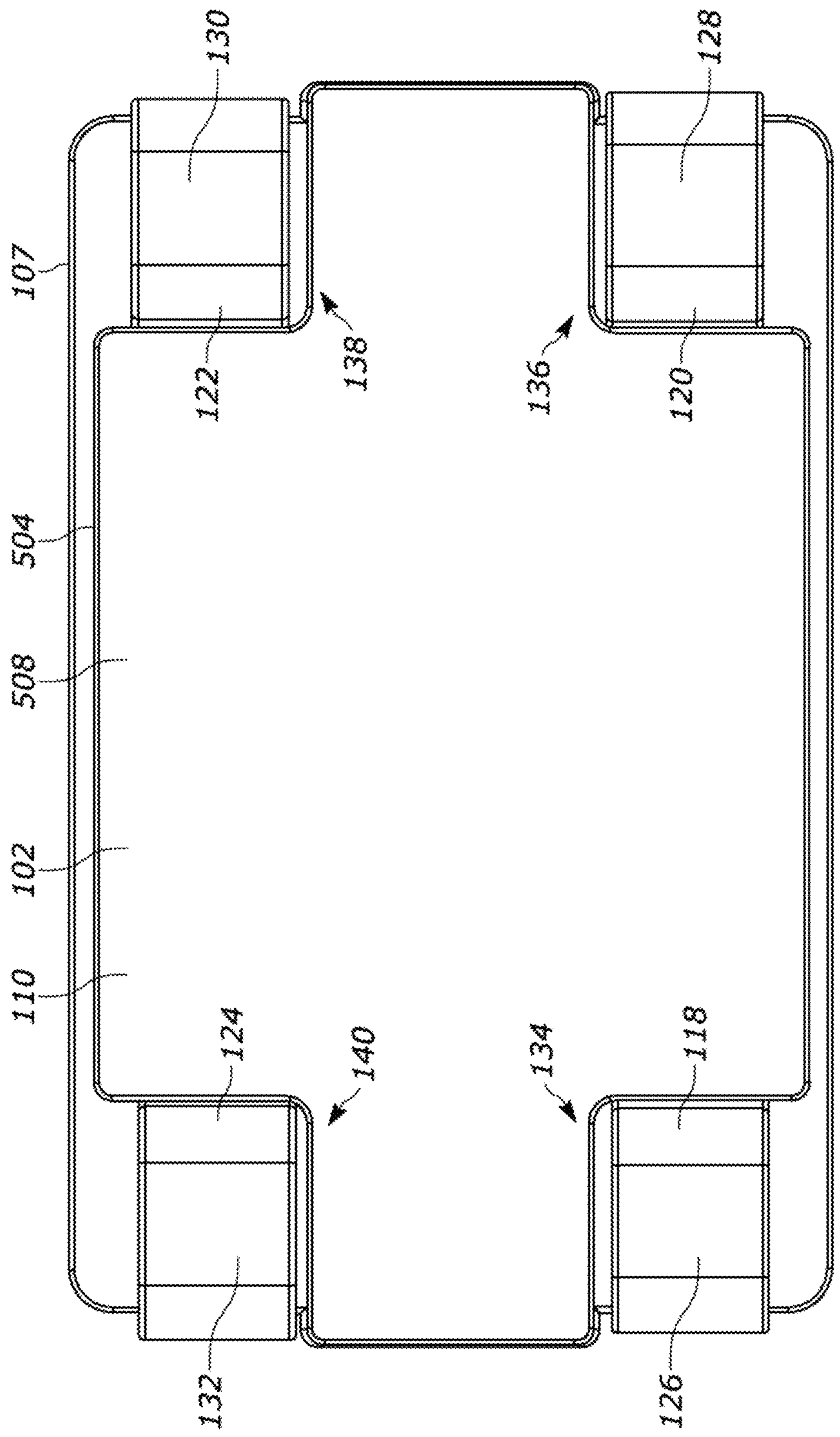
FIG. 6 is a bottom elevational view of the electronic component of FIG. 1.

The flanged portion 110 shown in FIG. 1 has a somewhat square or rectangular top-view cross-section by at least one approach, however circular or hexagonal cross sections are also contemplated. Referring now to FIG. 5, which shows a side elevational view of the component 100, the thickness of the flanged portion 110 creates a flange edge 504 which is located between a substantially flat upper surface 506 and lower surface 508 of flange 110. Referring to FIGS. 1, 5, and 6, the flange 110 and flange edge 504 include one or more recesses or cutouts 134, 136, 138, 140 which are configured to receive the first and second ends 118, 120, 122, 124 of the first and second flat wires 104, 106, respectively. As is shown in FIGS. 1 and 5, in a self-leaded approach, the ends 118, 120, 122, 124 may be configured to form the terminals 126, 128, 130, 132 through one or more bends 510.

In a particular arrangement, as illustrated in FIGS. 1 and 5, a portion of the second ends 120, 124 of each of first and second flat wires 104, 106 exits the intertwined spiral windings 116 at its bottom and travels along the upper surface 506 of the flanged portion 110 to cutouts 136, 140. With brief reference to FIG. 2, which illustrates a top view of the component 100, by one approach, the second ends 120, 124 of the first and second flat wires 104, 106 exit the intertwined spiral windings 116 approximately 180 degrees from each other about the longitudinal axis 320 of the core 102 and/or the intertwined spiral windings 116. Returning to FIG. 5, upon encountering each respective cutout 136, 140, a downward bend 510 is formed in the second ends 120, 124 so that it passes substantially through the flange portion 110. Each second end 120, 124 is then bent so that a portion of each second end 120, 124 extends approximately flush with the lower surface 508 of the flange portion 110, thereby forming the terminals 128, 132. Each end 120, 124 may then be bent upward outside of the outer body 107 or partially embedded into the side of the outer body 107 so as to form a terminal end that is accessible from the side of the component 100 (i.e., to provide soldering access to remove or place the component 100 on a PCB) and to retain the respective conductor windings 112, 114 and ends 120, 124 in their fixed locations. Further, such upward bending also helps to reduce the number of dead solder joints during assembly of the PCB.

Similarly, the first ends 118, 122 of the first and second flat wires 104, 106 exit the intertwined spiral windings 116 at its top and travel straight outward therefrom. With brief reference to FIG. 2, which illustrates a top view of the component 100, by one approach, the first ends 118, 122 of the first and second flat wires 104, 106 exit the intertwined spiral windings 116 approximately 180 degrees from each other about the longitudinal axis 320 of the core 102 and/or the intertwined spiral windings 116. Upon reaching the x-y coordinate of the edge of the cutouts 134, 138, the first ends 118, 122 of the first and second flat wires 104, 106 can be bent downward to travel downward next to the intertwined spiral windings 116 and to pass through the cutouts 134, 138. The terminals 126, 130 can then be formed as described above with respect to terminals 128, 132.

Figure 7:
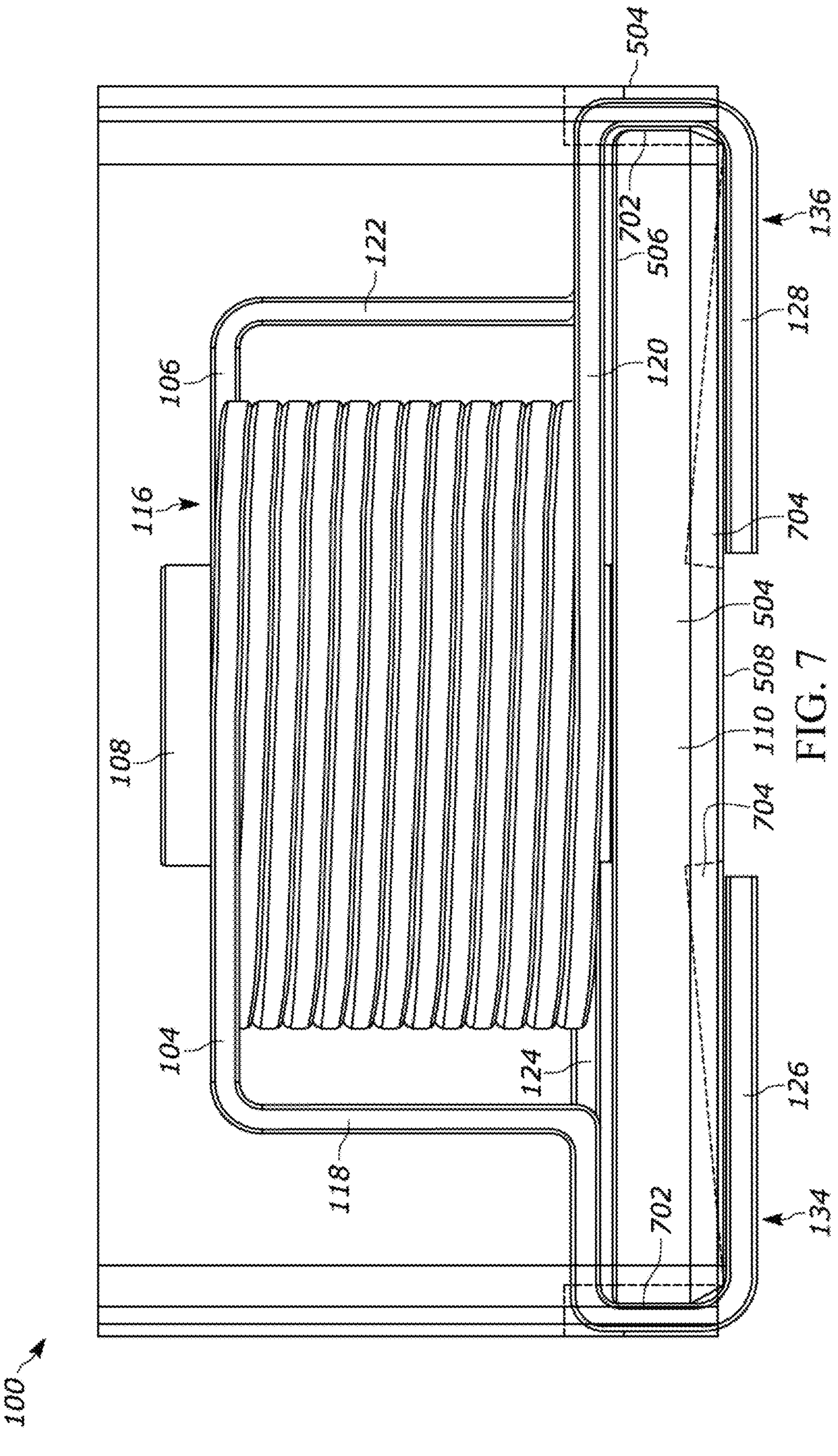
FIG. 7 is a side elevation view of an alternative form of the electronic component of FIG. 1 in accordance with various embodiments.
Figure 8:
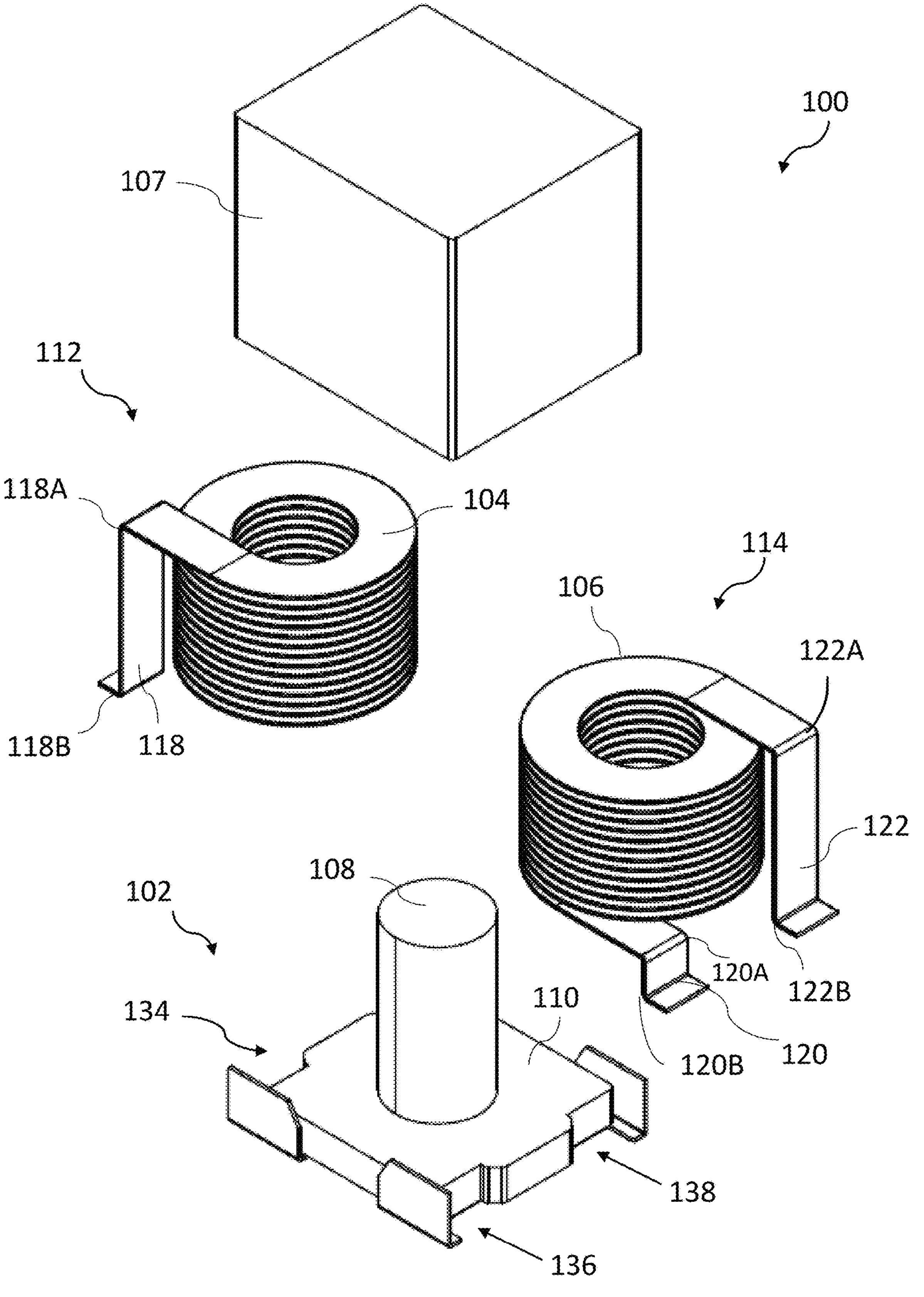
FIG. 8 is a perspective exploded view of an electronic component in accordance with this disclosure illustrating wires of the electronic component separated from one another.
Figure 9:
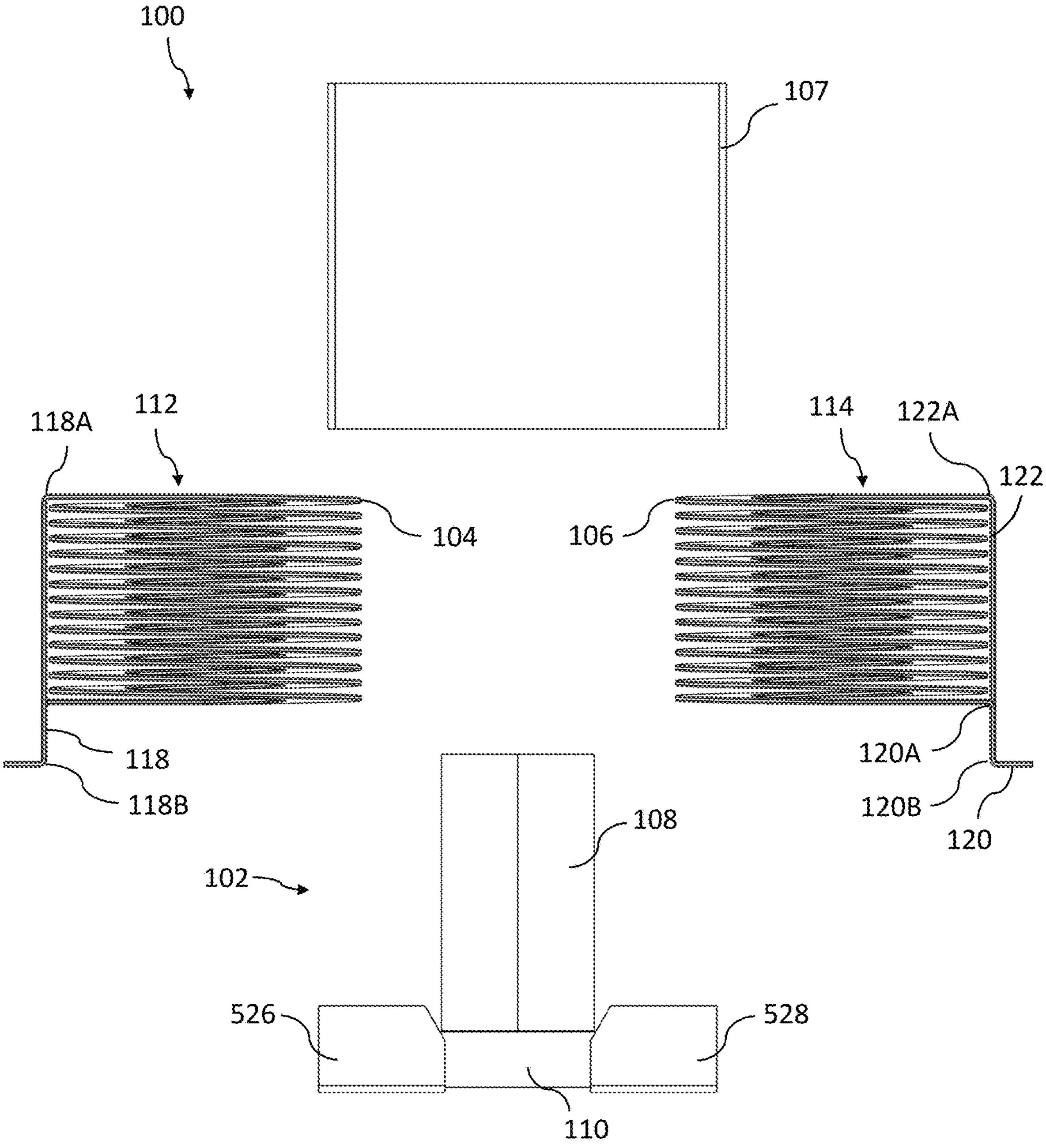
FIG. 9 is a front elevational exploded view of the electronic component of FIG. 8 illustrating the wires separated from one another.
Figure 10:
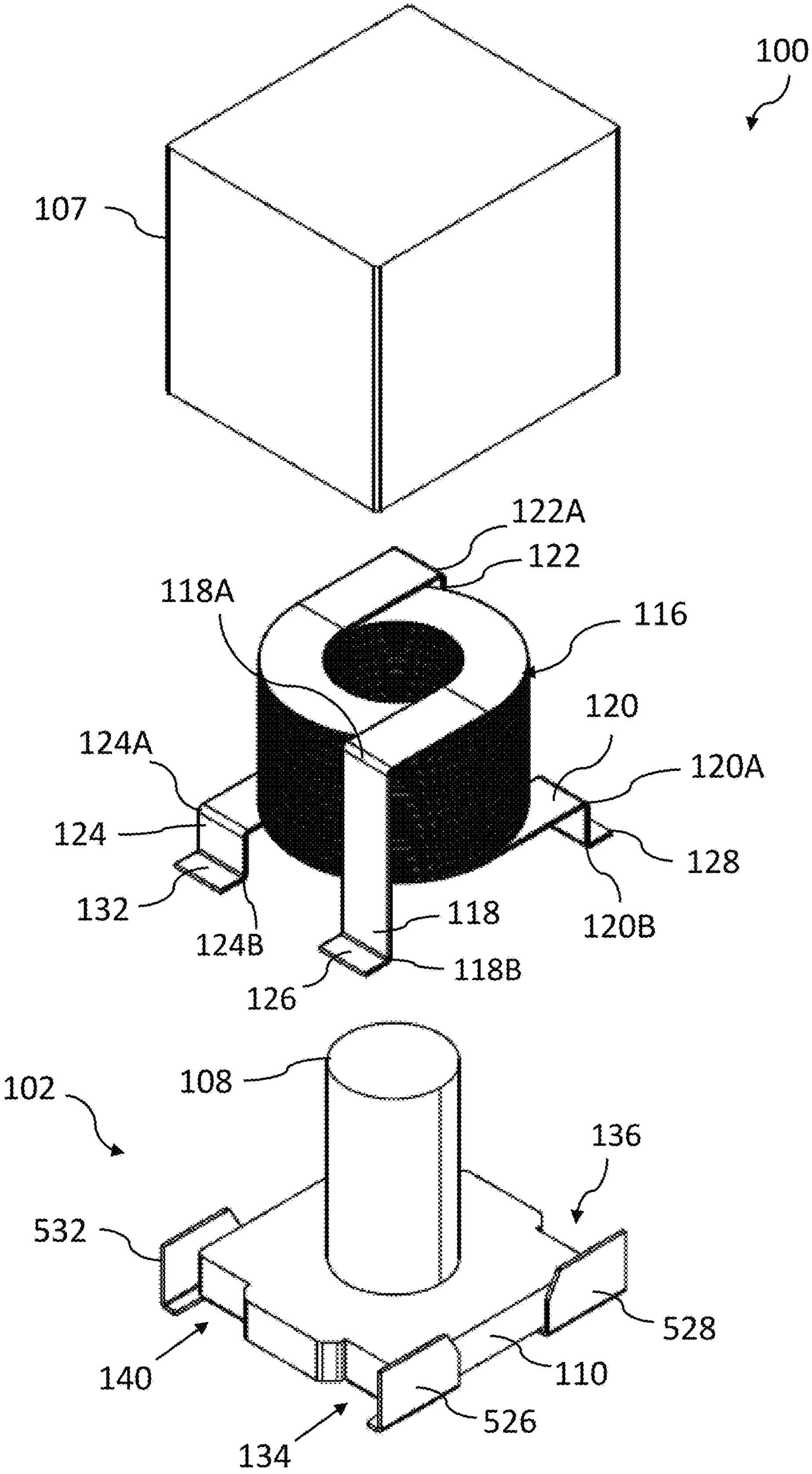
FIG. 10 is a perspective exploded view of the electronic component of FIG. 8 shown with the wires intertwined, screwed or meshed together.

Referring now to FIG. 7, an alternative embodiment is illustrated. The electronic component 100 is, for the most part, similar to those illustrated and described in other figures. However, an alternative method of terminating the wire ends 118, 120, 122, 124 of the first and second conducts 104, 106 is shown. The wire ends 118, 120, 122, 124 travel along the flat upper surface 506 of the flange 110 until each end encounters the flange edge 504 or a small recess 702 in the flange edge 504 (small compared to the cutouts 134, 136, 138, 140). Then, each end is bent approximately 180° around the flange edge 504 or the recess 702 so that is it flush with or adjacent to the lower surface 508 of the flange 110. Optionally, terminal indentations 704 may be formed in the lower surface 508 to aid in bending of the wire ends 118, 120, 122, 124 around the flange 110. Spring forces in the conductors may require a slight over bend to ensure the wire ends sit flush with or parallel to the lower surface 508, and the indentations 704 provide extra room for the over bend. As described above, in a self-leaded approach, the wire ends 118, 120, 122, 124 may form the actual terminals 126, 128, 130, 132. In yet other embodiments, it should be understood that metalized pads may be added to the body of the component 100 with ends soldered or welded to the same. In still other forms, clip type terminals can be added to the component 100 with the ends soldered or welded thereto. The recesses 702 in the flange edge 504 allow for access to the wire ends 118, 120, 122, 124 and/or the terminals 126, 128, 130, 132 from the side of the bottom edge of the component 100. The bending action on the wire ends may be performed directly on the flange 110 or may be performed off the flange (for example, on a mandrel or other conventional bending devices) and then installed onto the flange 110.

Alternatively, as mentioned above, the first and second ends 118, 120, 122, 124 of the first and second flat wires 104, 106 may be coupled to a separate terminal pads or electrically conductive mechanical clip terminals for coupling the component 100 to a PCB. The ends are preferably embedded in a metalizing thick film on the bottom surface 508 and/or edges 504 of the flanged portion 110 of the core 102 forming terminals so that a strong electrical connection will be made between the component 100 and the PCB when the component 100 is soldered to the PCB via conventional soldering techniques. In alternate embodiments, however, the wire ends may be connected to the terminals using other conventional methods, such as by staking or welding them to the terminals.

The metalized pads (not shown) are preferably made of a heat-curable thick film, such as silver paste thick film. It should be understood, however, that other conventional materials may be used to form the terminals in place of silver thick film, such as for example other precious metals or electrically conductive materials. By at least one approach, the silver thick film terminals are applied by a screen printing process. In addition to a screen printing process, however, the metalized pads could be applied by spraying, sputtering or various other conventional application methods that result in a metalized surface.

Since the core 102 can itself be metalized by this alternative embodiment, the assembly of the component 100 need not require additional steps for attaching terminals to the component 100, such as by attaching clip type terminals to the outer body 107 or insulating the outer body 107 so that such terminals can be connected thereto. Thus, the component 100 not only can be used for low current, high inductance applications, but also can reduce the amount of steps required to produce such an electrical component 100.

Referring now to FIG. 6, which illustrates a bottom view of the electronic component 100 in accordance with various embodiments, the recesses or cutouts 134, 136, 138, 140 are preferably positioned in pairs on opposite sides of the flange 110. So configured, the flange 110 takes on a symmetrical shape with one pair of oppositely situated cutouts 134, 136 providing access to terminals 126, 128 of the first winding and another pair of oppositely situated cutouts 138, 140 providing access to terminals 130, 132 of the second winding. The symmetry of the flange 110 allows the orientation of the core 102 to have minimal impact on the assembly of the component 100 or on the placement of the component 100 on a PCB.

Continuing with FIG. 6, it is noted that the footprint of the component 100 can be minimized. By one approach, the footprint can be as small as approximately 3 mm×3 mm (or 2 mm×2 mm if round wire is used instead of edge-wound flat wire) to as high as 35 mm×35 mm. The footprint can occupy a square space, or as is illustrated in the various figures, a rectangular shape. In one preferred embodiment illustrated herein, the footprint is rectangular having dimensions of approximately 19 mm×11 mm. Additionally, any individual value or other range or ranges within these disclosed ranges may be appropriate for the footprint dependent on the requirements of a given application.

Referring now to FIGS. 8-11, an electronic component according to an alternative embodiment is illustrated. The electronic component 100 is similar in many respects to those described above with the differences highlighted in the following discussion. The component 100 is shown in an exploded configuration in FIGS. 8-10 to illustrate how the parts of the component 100 are joined together to form the finished component 100. The component 100 includes a flange 110 and an elongated member 108 extending from the flange 110. The component 100 includes a first flat wire 104 and a second flat wire 106 that are wound into coils 112, 114 and intertwined with one another. The first flat wire 104 and second flat wire 106 are shown separated from one another in FIGS. 8-9 and intertwined with one another to form the intertwined spiral windings (or bifilar edge-winding) 116 in FIG. 10. The elongated member 108 extends through central opening of the intertwined spiral windings 116. The outer body 107 covers at least a portion of the wires 104, 106 and a portion of the flange 110 in the finished component 100. In one form the coils can be wound separate and screwed or meshed together to form a combined winding with a common inner opening through which the core is positioned or disposed. This configuration allows for different turn counts for the two windings (e.g., to create a step-up transformer, a step-down transformer, etc.) For example, a ten turn winding may be screwed together with a five turn winding for step-up or step-down applications. In addition, the relative locate of one winding to the other can be changed. For example, in one form the smaller winding may be centered with respect to the larger winding and combined therewith. However, in alternate forms, the smaller winding may be positioned lower in relation to the larger winding (e.g., at one end of the larger winding) and meshed thereto, or in other forms the smaller winding may be positioned higher in relation to the larger winding (or at the other end of the larger winding) and meshed thereto. In a preferred form, the windings will be pushed together and then rotated with respect to one another (or screwed together) to intertwine the coils and form the common or single column of windings with a common central opening illustrated for example in FIGS. 1-7 and 10.

The coil 112 of the first wire 104 and the coil 114 of the second wire 106 may be intertwined with one another to form the intertwined spiral windings 116 according to the methods described above such that turns of the first coil 112 and turns of the second coil 114 are interleaved. As shown, the flat wires 104, 106 are wound with one turn of the first flat wire 104 in between two turns of the second flat wire 106 to form a transformer having a 1:1 winding ratio, however, in other forms, other winding ratios may be achieved according to the configurations and methods described above. The first flat wire 104 may be wound into a coil about a central axis simultaneously with the second flat wire 106 to form the intertwined spiral windings 116 of wires 104, 106. In other forms, the first wire 104 may be wound into a first coil 112 and the second wire 104 wound into a second coil 114 separate from the first coil with the two coils being joined together or intertwined, for example, by screwing the two coils together or sliding the turns of the coil 112 of the first wire 104 in between turns of the coil 114 of the second wire 106.

Figure 11:
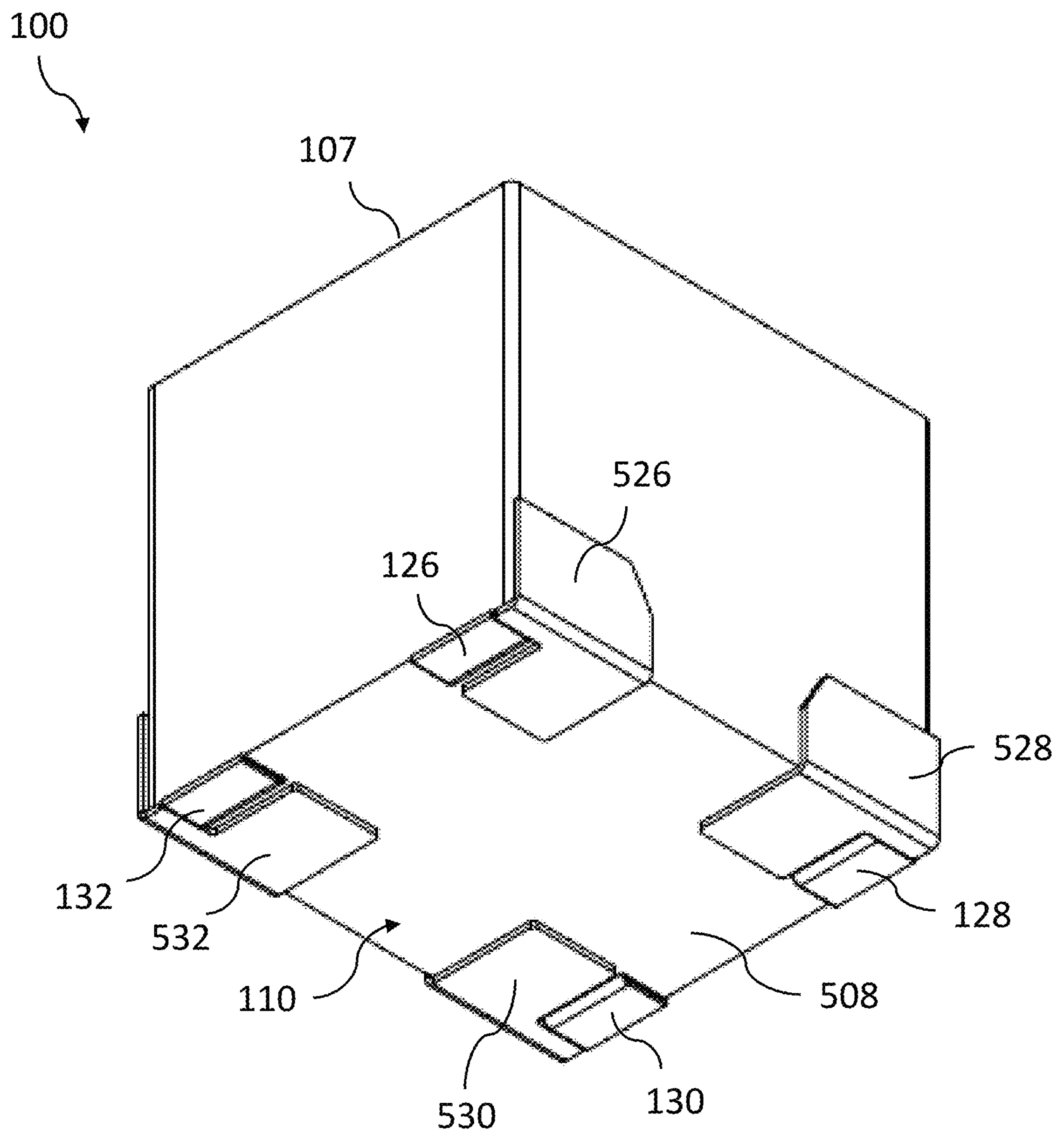
FIG. 11 is a bottom perspective view of the electronic component of FIG. 8 shown in an assembled configuration.
Figure 12:
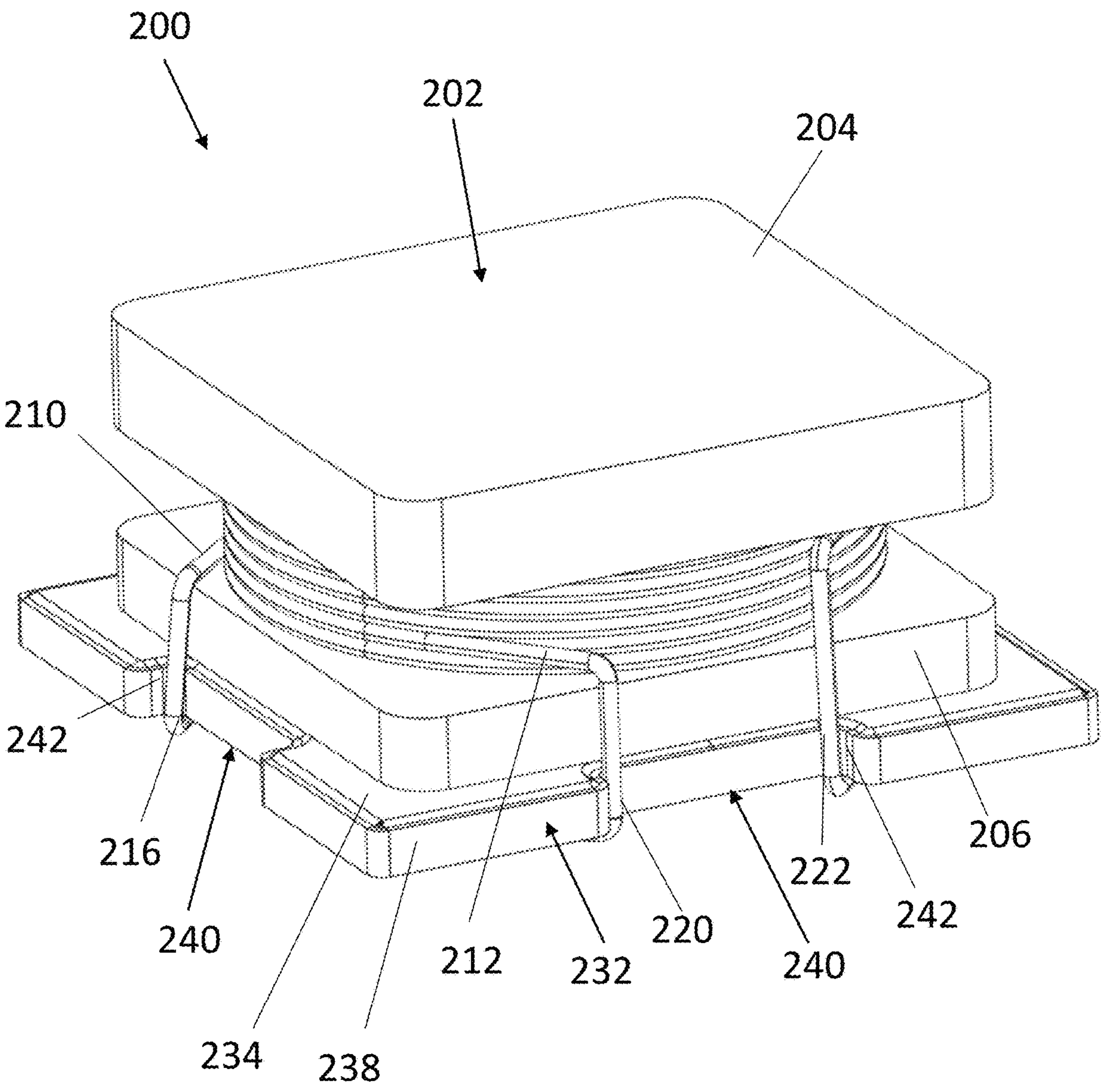
FIG. 12 is a top perspective view of an electronic component according to another embodiment.
Figure 13:
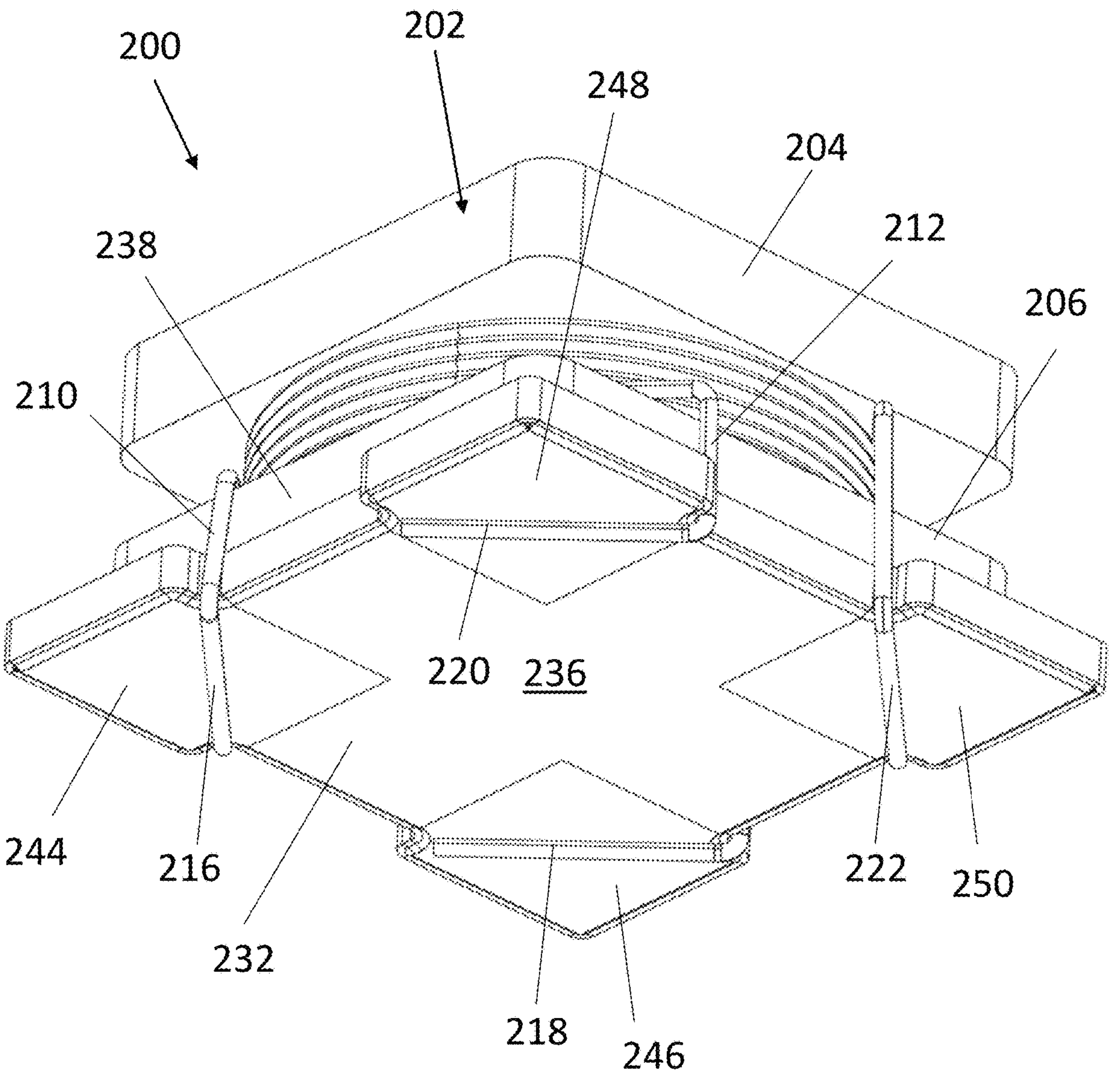
FIG. 13 is a bottom perspective view of the electronic component of FIG. 12.
Figure 14:
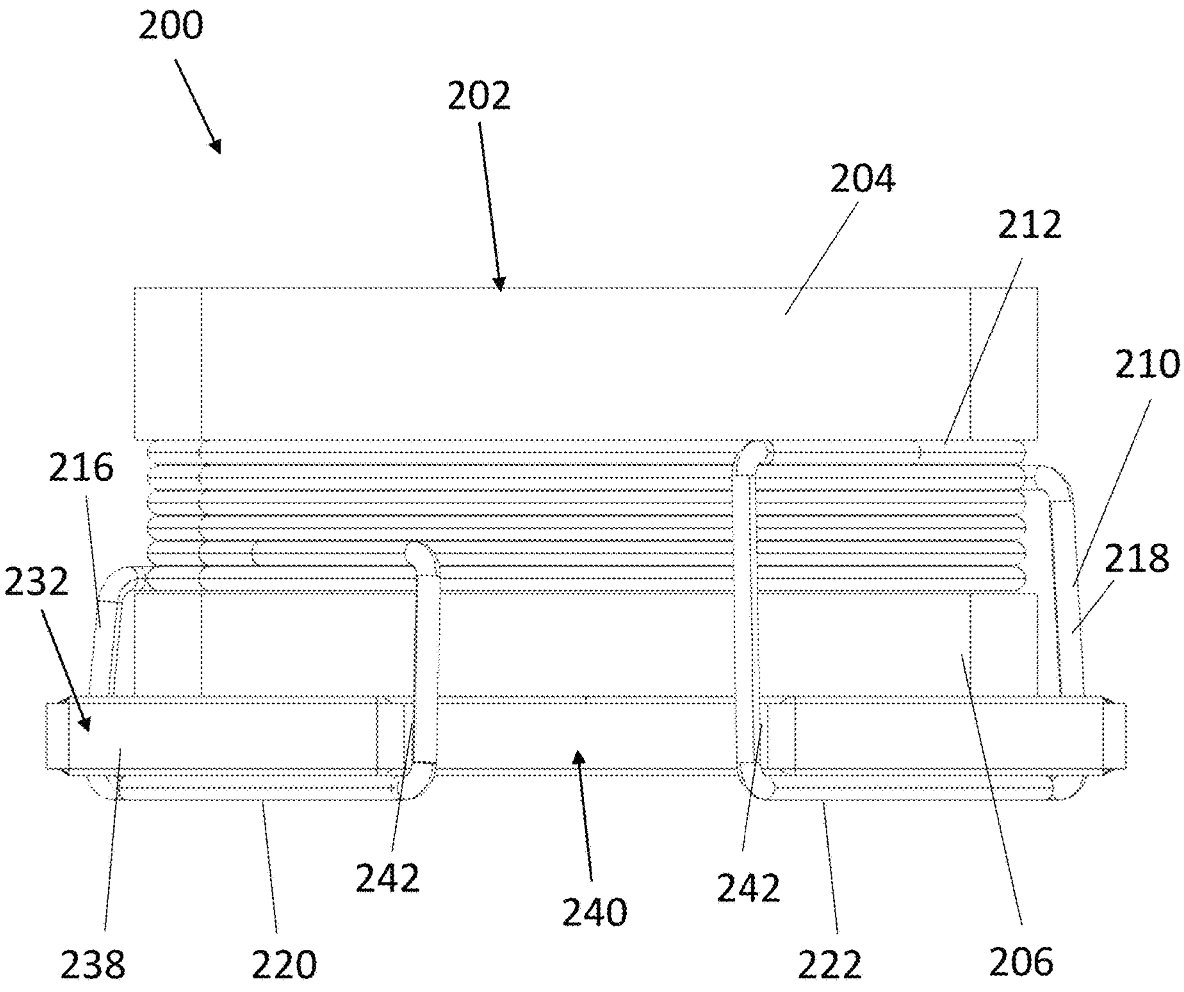
FIG. 14 is a side elevation view of the electronic component of FIG. 12.
Figure 15:
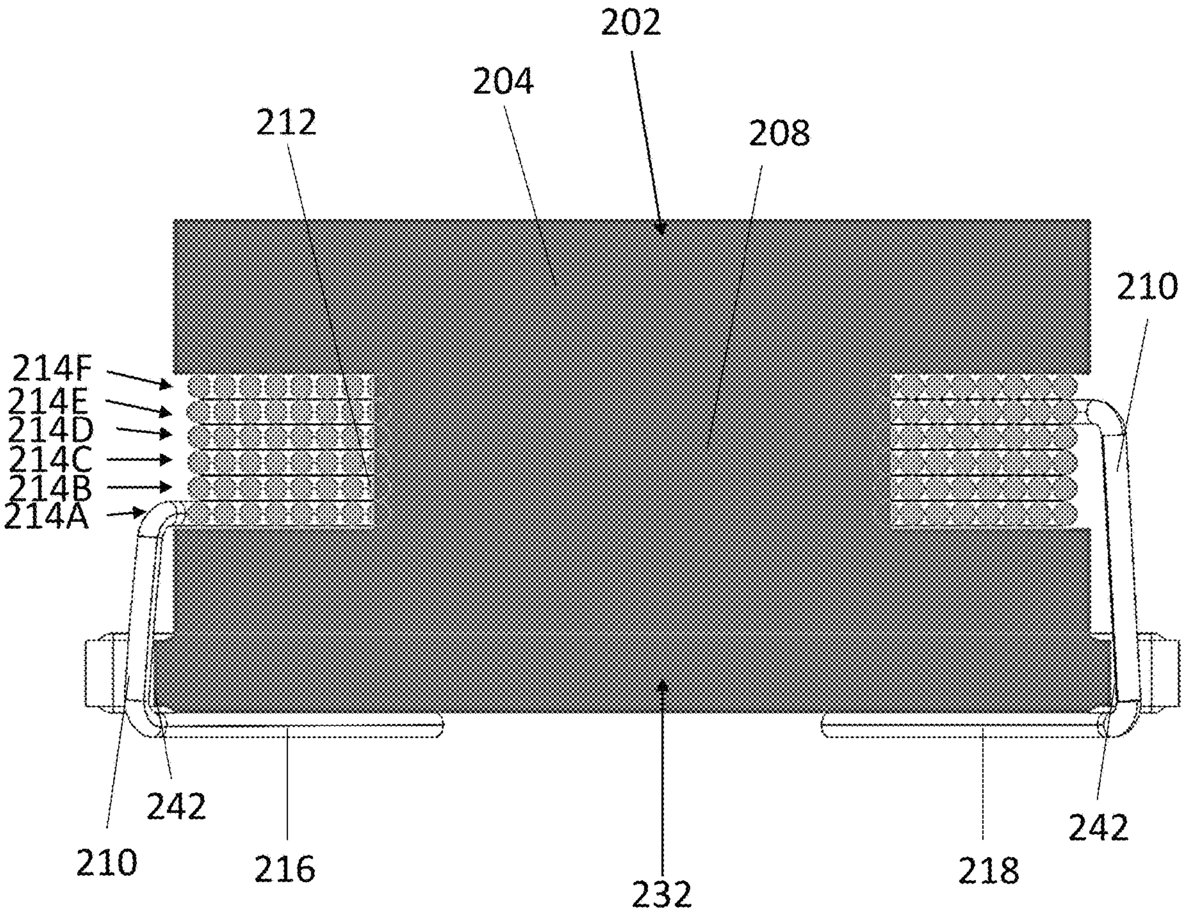
FIG. 15 is a cross-section view of the electronic component of FIG. 12.

The flange 110 includes recesses or cutouts 134, 136, 138, 140 for the ends of the wires 104, 106 to extend along the flange 110 for connection to a circuit. As shown in FIG. 11, the wire ends of the wires 104, 106 form the terminals 126, 128, 130, 132 for the component 100. In other forms, the wire ends may extend to terminals (e.g., metalized pads or clips) of the component 100 with the terminals being used to attach the component to a circuit. The first end 118 of the first coil 112 includes a first bend 118A with the first end 118 of the first wire 104 extending substantially vertically (e.g., within 20 degrees from vertical or the axis of the coil 112) from the top of the coil 112 along the outside of the coil toward the bottom of the coil 112. The first end 118 of the first wire 104 extends below the bottom turn of the coil 112 and into the cutout 134 of the flange 110. The wire end 118 positioned within the cutout has a second bend 118B (e.g., at a ninety-degree angle) to form a terminal 126 that extends substantially parallel to the bottom surface 508 of the flange 110 and/or is flush with and extends substantially within the plane of the bottom surface 508 of the flange 110. The second end 124 of the first wire 104 extends from the bottom end of the first coil 112 along the top surface of the flange 110 to the cutout 140 where the second end 124 includes a first bend 124A to extend into the cutout 140. The second end 124 includes a second bend 124B (e.g., at a ninety-degree angle) to form a terminal 132 that extends substantially parallel to the bottom surface 508 of the flange 110 and/or is flush with and extends substantially within the plane of the bottom surface 508 of the flange 110.

Similarly, the first end 122 of the second coil 114 includes a first bend 122A with the first end 122 of the second coil 114 extending substantially vertically (e.g., within 20 degrees from vertical or the axis of the coil 114) from the top of the coil 114 along the outside of the coil 114 toward the bottom of the coil 114. The first end 122 of the second wire 106 extends below the bottom turn of the coil 112 and into the cutout 138. The first end 122 of the second wire 106 positioned within the cutout 138 includes a bend 122B (e.g., at a ninety-degree angle) to form a terminal 130 that extends substantially parallel to the bottom surface 508 of the flange 110 and/or that is flush with and extends substantially within the plane of the bottom surface 508 of the flange 110. The second end 120 of the second wire 106 extends from the bottom end of the second coil 114 along the top surface of the flange 110 to the cutout 136 where the second end 120 includes a first bend 120A to extend into the cutout 136. The second end 120 includes a second bend 124B (e.g., at a ninety-degree angle) to form a terminal 128 that extends substantially parallel to the bottom surface 508 of the flange 110 and/or that extends flush with or substantially within the plane of the bottom surface 508 of the flange 110.

The wire ends 118, 120, 122, 124 form the actual terminals 126, 128, 130, 132 of the component 100 such that the ends of the wires are mounted directly to a circuit (e.g., a circuit board) with no intermediate pad or conductor. In other forms, the wire ends are soldered or welded to a metal pad or terminal and the metal pad or terminal is soldered or welded to the circuit. In some forms, the wire ends 118, 120, 122, 124 extend below the bottom surface 508 of the flange 110.

The component 100 may further include metalized pads 526, 528, 530, 532 affixed to the flange 110 adjacent the cutouts 134, 136, 138, 140. The metalized pads 526, 528, 530, 532 may be bonded to the flange 110 so that the ends of the wire ends 118, 120, 122, 124 may be electrically connected to thereto. The metalized pads may be terminals of the component 100 and may be electrically and mechanically connected to a circuit to connect the component 100 to a circuit. The metalized pads may be secured to the flange by an adhesive, for example. In some forms, the metalized pads further include spikes that extend inward and into the flange 110 such that the metalized pads are held in place by the molding material of the flange 110. The metalized pads may extend along the sides of the flange 110 and include a bend to extend along the side surface and bottom surface 508 of the flange 110. The metalized pads may extend beyond the flange 110 and along the cutouts 134, 136, 138, 140 of the flange 110. The wire ends 118, 120, 122, 124 may be brought into contact with the respective metalized pads 526, 528, 530, 532 and/or soldered or welded thereto to conductively connect each wire end to the corresponding metalized pads. For example, each wire end may soldered to a portion of the metalized pads extending along the cutouts of the flange 110. Thus, the component 100 may be mounted by soldering or welding the wire ends 118, 120, 122, 124 and/or the metalized pads 526, 528, 530, 532 to a circuit (e.g., a printed circuit board).

In a preferred embodiment, the elongated member 108 and flange 110 are integral with one another and are formed during the processing of the core 102. In the forms illustrated in FIGS. 1-11, the tack core 102 is shaped into a green body comprised typically of ferrite or powdered iron, or a composition of both, and then subsequently fired or sintered at high temperatures in a furnace or kiln. Sintering allows for a denser core 102, and by making the core 102 of a low-loss soft magnetic material like ferrite, or a composition including ferrite, the electronic component 100 operates more efficiently, particularly in low current, high inductance applications, by producing a relatively low DCR and improved coupling. The relative ease of shaping a ferrite green body allows the core 102 to be made in a variety of shapes and sizes depending on the application, including the tack core 102 shape illustrated and described herein.

In yet other embodiments, cores 102 having a variety of different shapes and sizes may be used. For example, a rod type core may be used in one embodiment and a drum or bobbin type core may be used in another embodiment. In still other embodiments, a toroid or other conventional core shape may be used. Further, the size of the core 102 may be varied in order to customize the component 100 for specific applications, as will be discussed further below.

Together the tack core 102 and the intertwined spiral windings 116 comprise an assembly. Once assembled, the assembly is encased or encapsulated in the outer body 107. By one approach, the outer body 107 comprises a mixture of magnetic and/or non-magnetic powder that can be either potted and cured or compression molded. For example, in one embodiment, the mixture that makes up outer body 107 includes a powdered iron, such as Carbonyl Iron powder, and a polymer binder, such as a plastic solution, which are compression molded over the core 102 and intertwined spiral windings 116. In a preferred form, the ratio of powdered iron to binder is about 10% to 98% powdered iron to about 2% to 90% binder, by weight. In the embodiment illustrated, the ratio of powdered iron to binder will be about 80% to 92% Carbonyl Iron powder to about 8% to 20% polymer resin, by weight.

It is possible and even desirable in some low current, high inductance applications for the molded mixture of the outer body 107 to further include powdered ferrite and, depending on the application, the powdered ferrite may actually replace the powdered iron in its entirety. For example, a ferrite powder with a higher permeability may be added to the mixture to further improve the performance of the component 100. The above ratios of powdered iron are also applicable when a combination of ferrite and powdered iron is used in the mixture and when powdered ferrite is used alone in the mixture. In yet other embodiments, other types of powdered metals may be used in addition to or in place of those materials discussed above.

After compression molding the mixture, the mold may be removed from a molding machine and the component 100 may be ground to the desired size (if needed). The component 100 is then removed from the mold and stored in conventional tape and reel packaging or other conventional packaging for use with existing pick-and-place machines in industry. A lubricant such as Teflon or zinc stearate may also be used in connection with the mold in order to make it easier to remove the component 100, if desired.

Alternatively, the component 100 may be made by potting and curing the mixture that makes up the outer body 107, rather than compression molding the component 100. The main advantages to potting and curing are that the component 100 can be manufactured quicker and cheaper than the above-described compression molding process will allow. In this embodiment, the mixture that makes up outer body 107 may similarly be made of magnetic and/or non-magnetic material and will preferably include a powdered iron, such as Carbonyl Iron powder, and a binder, such as epoxy, which is potted and cured over the core 102 and winding 22. In this embodiment, the ratio of powdered iron or iron alloy to binder is about 10% to 98% powdered iron or iron alloy to 2% to 90% binder, by weight, with a preferred ratio of powdered iron or iron alloy to binder being about 70% to 90% powder iron or iron alloy to about 10% to 30% epoxy, by weight. As with the compression molded component 100, the potted component 100 may alternatively use powdered ferrite or a mixture of powdered ferrite and another powdered iron. In other forms, other types of powdered iron or iron alloys may be used and/or composite materials may be used, if desired. Some common materials used for the powdered iron include amorphous alloy powders, carbonyl iron powder, nylon coated barium ferrite powders, barium ferrite powders, iron powders, steel powders (e.g., Anchor, Ancormet, Ancorsteel), magnetic ceramic powders (e.g., Ceramag), as well as other equivalent materials and mixtures. In some forms, materials may be at least one material selected from the group consisting of carbonyl iron powders, ferrite powders, barium ferrite powders, iron powders, steel powders, permalloy powder, sendust powder, magnetic ceramic powders, iron alloys, as well as mixtures thereof. The binder may be any conventional binder, e.g., any epoxy binders including epoxy powder, phenol (phenolic) resins, silicone resins, acrylic resins, or other binders, such as hot melt adhesives of one or more materials from the group comprising thermoplastic resins, thermosetting resins (thermal set), polyvinyl alcohol (PVA) binder, polyvinyl butyral (PVB) binder, hot melt adhesives, or other similar binders as well as mixtures thereof.

In this configuration, the assembled core 102 and intertwined spiral windings 116 will preferably be inserted into a recess that contains the mixture making up the outer body 107 and an adhesive such as glue. The mixture and assembly is then cured to produce a finished component 100. As with the first embodiment discussed above, the cured component 100 may also be ground to a specific size (if desired) and then packaged into convention tape and reel packaging for use with existing pick-and-place equipment.

Regardless of whether the component 100 is potted and cured, injection molded (including for example transfer molding of a liquid or slurry of mixtures), or compression molded (e.g., wet press or dry press compression molding), the ratio of binder (e.g., epoxy, resin, etc.) to magnetic and/or non-magnetic material (e.g., powdered iron, powdered ferrite, etc.) impacts the inductance and current handling capabilities of the electronic component 100. For example, increasing the amount of epoxy or resin and lowering the amount of powdered iron produces a component 100 capable of handling higher current but having lower inductance capabilities. Therefore, changing the ratio of the substances relative to one another produces different components 100 with different capabilities and weaknesses. Such options allow the component 100 to be customized for specific applications. More particularly, customizing the electronic component 100 allows the component 100 to be precisely tailored to the particular chosen application. Different applications have different requirements such as component size, inductance capabilities, current capacity, limits on cost, etc. Customization can include choosing a wire gauge and length relative to the amount of current and/or inductance required for the application. For example, higher inductance applications may require an increased number of coil turns, and/or a wire with a relatively large cross-sectional area (i.e., gauge).

In addition, customization can include selecting the material that comprises the core 102, along with the dimensions, and structural specifications for the core 102. For example, a ferrite with higher permeability or higher dielectric constants may be chosen to increase inductance. By varying the ratio of elements that comprise the ferrite the grade of the ferrite changes and different grades are suited for different applications. Further, the thickness of the elongated member 108 and/or flange 110 may change the inductance characteristics or other characteristics of the component 100 and also may be limited by the current requirements, as ferrite can have significant losses in higher current applications.

While many of these variables can alter various specifications of the electronic components, many of them can also create constraints on other variables. For example, increasing the number of turns 302, 304 may limit the size of the core 102 that can be used if a specific component height must be reached. Therefore, application requirements and material limitations must be considered when choosing the core 102 material and other specifications.

In addition to choosing the core 102, the components of the mixture that makes up outer body 107 must also be selected. The mixture typically includes a powder metal iron such as ferrite or Carbonyl Iron powder and either resin or epoxy. The application and manufacturing constraints determine which components to include in the mixture. In low current, high inductance applications, it may be more desirable to increase the percentage of ferrite used in the mixture making up body 107. Conversely, in high current, low inductance applications, it may be more desirable to limit the percentage of ferrite (if any) used in the mixture making up body 107.

It is well known in the art to use a dry mold or dry press process to form a magnetic mixture around a wire coil, thereby creating a green body which can be further heated (i.e., a secondary heating) to form the electrical component 100. Such processes often require significant forces that can damage or destroy certain types, configurations, or gauges of wire. An electrical component 100 that has been damaged via such processes may short or otherwise fail. Further, the type and extent of damage that may occur during such processes can vary depending on the placement, direction, or magnitude of the compression forces involved, making this problem difficult to detect and address, and possibly resulting it some components 100 passing internal tests only to fail after shipment.

In order to avoid such shortcomings, the tack core 102 may be used to help retain and/or protect the configuration of the edge-wound flat wire 104, 106 and help it withstand the various forces and pressures it may be subjected to during manufacture. Furthermore, instead of employing a dry press process to mold the mixture around the wire, the mixture making up outer body 107 may be heated to a liquid that can then be dispersed (e.g., injected or disposed) over at least a portion of the intertwined spiral windings 116 to avoid exposing the windings to the damaging forces of a dry press process. For example, in one form, the mixture may be liquefied and dispersed over the intertwined spiral windings 116 and the core 102 via an injection molding, compression molding or other molding process, and then hardened to form outer body 107. After the liquid mixture has been formed into the outer body 107, the component 100 may be removed from the mold.

By a further embodiment, the outer body 107 may be a pre-formed cap or case that may be composed of any of the various combinations of materials discussed above, or may be composed of formed sheet metal or cast metal, such as aluminum, steel, copper, or the like. The pre-formed outer body 107 is then attached to the flanged portion 110 and/or the top of the elongated member 108 of the core 102 by conventional means to form an encased component 100.

So configured, the electronic component 100, comprising a transformer in this example, will have improved electronic characteristics. More specifically, by utilizing the intertwined edge-wound flat wire windings 116 as discussed herein, a maximum surface area between the different windings can be achieved, thus improving the performance thereof. For example, because of the adjacent flat surfaces 308, 310, 312, 314 of the flat wires 104, 106, coupling can be improved up to approximately 99.9%, or a K-value of 0.999. In the embodiment illustrated in the figures, coupling of between approximately 95% to 99% can be expected, corresponding to K-values of 0.95 to 0.99. Inductive ranges can also be improved, with a range of approximately 220 nH to 33 uH, with the embodiment illustrated herein exhibiting a range of approximately 220 nH to 10 uH. Further, a DC resistance (DCR) can be reduced to as low as 0.05 mΩ up to 18 mΩ per winding, with the illustrated embodiments exhibiting a DCR range of approximately 0.25 mΩ to 40 mΩ per winding. Further, a self resonant frequency (SRF) of the transformer can be as high as 300 MHz on the high end, with the illustrated embodiments exhibiting a SRF range of approximately 10 MHz to 100 MHz. Regarding power handling, the transformer configured as described herein can handle between 5 amperes and 125 amperes of current, with the illustrated embodiments capable of handling between approximately 10 amperes and 100 amperes. A working voltage range of the transformer can be as high as 100 volts, while a surge voltage handling can be up to 1,000 volts when using the optional additional dielectric insulation 408 described above.

By creating a transformer according to these teachings, the transformer is well suited for use in power applications, such as battery power application, and more particularly in applications where the input is higher than the output. Further, the transformer may be well suited for single-ended primary inductance converter (SEPIC) applications, common mode choke applications, filter applications, or many other applications utilizing one or more transformers. By using a flat wire approach as described herein, a height 512 of the transformer can be minimized, making the disclosed transformer ideal for use in portable electronics or communication devices where space is of utmost concern. Particularly, with a drive to make electronic devices as thin a possible, minimizing a height 512 of the transformer off of the PCB is advantageous in such applications.

Although a flat wire embodiment is described in detail throughout this disclosure, other wire forms may be suitable for use in the electronic component 100, including standard round wire, thin films, or other conductors. For example, these teachings can readily be utilized with eighteen to forty-two gauge round wire (18 AWG-42 AWG), though wire of larger or smaller gauges can be utilized equally as well dependent upon the specifics of the application. This gauge range may apply for the flat wire applications as well. In practice, the specific application and height of the component 100 will often factor into what wire type and wire gauge are selected. Similarly, as the preferred embodiment shows the component configured in a self-leaded configuration (e.g., where the ends of the conductor are used to actually serve as the terminals), it should be understood that in alternate forms, the component may be configured such that additional clips are added to the component and bonded to the conductor ends (e.g., such as by solder) such that the clips actually serve as the component terminals for connecting the component to a circuit on a printed circuit board (PCB). In still other forms, the terminals may be formed on the component via metalization or a deposition process where the metalized or deposition surface serves as the terminal along with the respective conductor end connected thereto via solder or the like.

With respect to FIGS. 12-15, an electronic component 200 is provided according to another embodiment. The electronic component 200 is similar to the embodiments discussed above such that the differences will be highlighted. The electronic component 200 includes a core 202 such as a drum core having a first flanged portion 204, a second flanged portion 206 spaced from the first flanged portion 204, and a post or elongate portion 208 extending between the first and second flanged portions 204, 206. The core 202 may be formed of magnetic and/or non-magnetic materials similar to the cores of the embodiments described above.

The electronic component 200 includes a first conductor 210 and a second conductor 212 wound about the elongate portion 208 of the core 202. The first conductor 210 and second conductor 212 may be round wire, having a circular cross-section. The first conductor 210 and second conductor 212 may be wound about the core 202 to form first and second windings about the core 202. For example, the first conductor 210 and second conductor 212 may together be wound about the core 202 to form intertwined windings.

The first and second conductors 210, 212 may be wound into a plurality of rows 214A, 214B, 214C, 214D, 214E, 214F each comprising a plurality of turns, the turns of each row increasing in diameter as the conductors 210, 212 are wound about the core 202. As one specific example, each row may have 8 turns. In other forms, the rows may have any other number of turns. In one approach, the first and second conductors 210, 212 are wound about the core 202 at the same time. The conductors 210, 212 may be wound axially about the core 202 to form the innermost turn of each row and then wound axially about the core 202 (e.g., in the opposite axial direction) to form a second turn of each row radially outward of the innermost turn. This process may be continued until the desired number of turns are added to each row.

In one form, the first conductor 210 is wound into a first winding including rows 214A, 214C, 214E that alternative with a plurality of rows 214B, 214D, 214F of a second winding formed by the second conductor 212. In another form, the rows 214A, 214B, 214C, 214D, 214E, 214F are each comprised of turns of the first conductor 210 and/or the second conductor 212. For example, each turn of an individual row may alternative between turns of the first conductor 210 and turns of the second conductor 212.

In the example, provided, the intertwined windings of the first and second conductors 210, 212 have six rows, however, in other embodiments, any number of rows may be used. Including the same number of turns and/or rows in the winding of the first conductor 210 as the second conductor 212 may be used to form a 1:1 winding ratio, for example, when forming an isolation transformer. In some forms, the first conductor 210 may be wound to include has more or less turns and/or rows than the second winding, for example, to have an imbalanced winding ratio, for instance, to step up or step down a voltage.

The first conductor 210 has a first end 216 and a second end 218 that extend from the first winding to form and/or be connected to terminals 220, 222 of the electronic component 200. The second conductor 212 has a first end 224 and a second end 226 that extend from the second winding to form and/or be connected to terminals 228, 230 of the electronic component 200.

The electronic component 200 includes a base 232 to which the second flanged portion 206 of the core 202 is mounted. The second flanged portion 206 of the core 202 may be secured to the base 232 by an adhesive, for example, an epoxy. The base 232 may be formed of a ferrite material. The base 232 includes an upper surface 234 to which the core 202 is mounted and a lower surface 236 to which the terminals 220, 222, 224, and 226 are mounted. The base 232 includes one or more sides 238 extending between the upper surface 234 and lower surface 236. The sides 238 may include recesses or cutouts 240 through which the ends 216, 218, 220, 222 of the first and second conductors 210, 212 extend from the windings to the lower surface 236 of the base 232. The cutouts 240 provide a passageway for the ends of the conductors 210, 212 to extend through so that the conductors 210, 212 do not increase the width and/or length of the electronic component 200 as they extend around the base 232. The cutouts 240 further may include a corner 242 that the conductors 210, 212 extend along when bent around the base 232 so that the conductors 210, 212 are in a predictable location (e.g., for a machine manufacturing the electronic component 200).

The metal pads 244, 246, 248, 250 may be attached to the lower surface 236 of the base 232. The ends 216, 218, 220, 222 of the conductors 210, 212 may be secured to the metal pads 244, 246, 248, 250, for example, by soldering. The metal pads and/or the ends of the conductors 210, 212 may form the terminals 220, 222, 228, 230 of the electronic component 200. For example, the metal pads and/or ends of the conductors 210, 212 may be electrically connected to conductors of a circuit, for example, conductors of a circuit board (e.g., a printed circuit board).

An outer body may be molded over at least a portion of the core 202 and portions of the first and second conductors 210, 212 similar to the embodiments discussed above.

Although the embodiments discussed herein have illustrated the component 100 as a transformer with two windings and four terminals, it should be understood that the above teachings may be applied to components 100 with more or less than two conductors and/or more or less than four terminals. For example, triple and quadruple wound transformers or inductors, and the like, may be made using similar processes or methods. Furthermore, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. An electronic component comprising:

a core;

a first wire wound at least in part about at least a portion of the core in a first winding, the first wire having a first end and a second end; and a second wire wound at least in part about at least a portion of the core in a second winding, the second wire having a third end and a fourth end;

wherein the first winding and the second winding alternate at least in part along at least a portion of the core, further comprising a magnetic and/or non-magnetic material forming an encapsulating body about the first winding and the second winding, and the first end and the second end of the first wire and the third end and the fourth end of the second wire exposed at the encapsulating body for electrically coupling the electronic component to at least one circuit.

2. The electronic component of claim 1 wherein the first winding includes a first plurality of turns, and the second winding includes a second plurality of turns.

3. The electronic component of claim 2 wherein the first plurality of turns and the second plurality of turns alternate at least in part along at least a portion of the core.

4. The electronic component of claim 3 wherein the first end of the first wire and the third end of the second wire exit the first plurality of turns of the first winding and the second plurality of turns of the second winding at a first axial end portion of the core.

5. The electronic component of claim 3 wherein the second end of the first wire and the fourth end of the second wire exit the first plurality of turns of the first winding and the second plurality of turns of the second winding at a second axial end portion of the core.

6. The electronic component of claim 3 further comprising an insulating dielectric disposed between a plurality of the first plurality of turns of the first winding and the second plurality of turns of the second winding that alternate at least in part along at least a portion of the core.

7. The electronic component of claim 6 wherein the insulating dielectric provides the electronic component with a voltage rating in a range of about 40 Volts to about 120 Volts.

8. The electronic component of claim 1 wherein the first wire is a flat wire, and the first winding is an edge-wound winding.

9. The electronic component of claim 8 wherein the second wire is a flat wire and the second winding is an edge-wound winding, the first wire includes a first flat surface of at least a portion of the first winding and the second wire including a second flat surface of at least a portion of the second winding, the first flat surface and the second flat surface remain substantially parallel to one another.

10. The electronic component of claim 9 wherein the first flat surface and second flat surface are substantially perpendicular to a longitudinal axis of the core.

11. The electronic component of claim 9 wherein turns of the first wire and turns of the second wire are alternatively stacked one upon another along the core.

12. The electronic component of claim 1 wherein the first end and the second end of the first wire extend from the core in a first direction.

13. The electronic component of claim 12 wherein the third end and the fourth end of the second wire extend from the core in a second direction, the second direction being different than the first direction.

14. The electronic component of claim 1 wherein the core further comprises:

an elongated member having a first end, a second end, and a longitudinal axis; and a flange member attached to the first end of the elongated member, wherein the first winding and the second winding extend around at least a portion of the elongated member.

15. The electronic component of claim 14 wherein the flange member defines at least one recess that receives at least one of the first end, the second end, the third end, and the fourth end of the first wire and the second wire.

16. The electronic component of claim 1 wherein a height of the electronic component along a central axis of first windings and the second windings is in a range of approximately 0.6 mm to approximately 30 mm.

17. The electronic component of claim 16 wherein the height of the electronic component along the central axis of the first winding and the second winding is a range of approximately 6 mm to approximately 14 mm.

18. The electronic component of claim 1 wherein the first wire and the second wire are round wires.

19. An electronic component comprising:

a core;

a first wire wound at least in part about at least a portion of the core in a first winding, the first wire having a first end and a second end; and a second wire wound at least in part about at least a portion of the core in a second winding, the second wire having a third end and a fourth end;

wherein the first winding and the second winding alternate at least in part along at least a portion of the core, wherein the core further comprises:

an elongated member having a first end, a second end, and a longitudinal axis; and a flange member attached to the first end of the elongated member, wherein the first winding and the second winding extend around at least a portion of the elongated member, wherein the flange member defines at least one recess that receives at least one of the first end, the second end, the third end, and the fourth end of the first wire and the second wire.

20. The electronic component of claim 19 wherein the flange member includes a first side and a second side, the elongated member extends from the first side, the at least one recess extends from the first side to the second side, and a portion of one of the first wire and the second wire includes one or more bends such that the at least one of the first end, the second end, the third end, and the fourth end of the first wire and the second wire extends substantially parallel to the second side of the flange member.

21. The electronic component of claim 20 wherein the at least one of the first end, the second end, the third end, and the fourth end of the first wire and the second wire extending substantially parallel to the second side of the flange member is flush with the second side of the flange member.

22. The electronic component of claim 20 wherein the at least one recess comprises four recesses extending from the first side to the second side of the flange member, one of the first end, the second end, the third end, and the fourth end extending into of one of the four recesses.

23. An electronic circuit comprising:

a core;

a first wire wound at least in part about at least a portion of the core in a first winding, the first wire having a first end and a second end;

a second wire wound at least in part about at least a portion of the core in a second winding, the second wire having a third end and a fourth end, the first winding and the second winding alternate at least in part along at least a portion of the core; and a circuitry with at least one of the first end, the second end, the third end, and the fourth end of the first wire and the second wire being electrically attached to the at least a portion of the circuitry, further comprising a magnetic and/or non-magnetic material forming an encapsulating body about the first winding and the second winding, and the first end and the second end of the first wire and the third end and the fourth end of the second wire exposed at the encapsulating body and electrically attached to the at least a portion of the circuitry.

24. The electronic circuit of claim 23 further comprising a board and wherein the at least a portion of the circuitry is associated with the board.

25. The electronic circuit of claim 24 wherein the board is a printed circuit board with the at least a portion of the circuit printed on the printed circuit board.

26. The electronic circuit of claim 23 wherein the first winding includes a first plurality of turns, and the second winding includes a second plurality of turns, wherein the first plurality of turns and the second plurality of turns alternate at least in part along at least a portion of the core.

27. The electronic circuit of claim 26 further comprising an insulating dielectric disposed between a plurality of the first plurality of turns of the first winding and the second plurality of turns of the second winding that alternate at least in part along at least a portion of the core.

28. The electronic circuit of claim 23 wherein the first winding has an inner diameter and/or outer diameter that is substantially the same as the second winding.

29. The electronic circuit of claim 23 wherein the core further comprises:

an elongated member having a first end, a second end, and a longitudinal axis; and a flange member attached to the first end of the elongated member, wherein the first winding and the second winding extend around at least a portion of the elongated member.

30. The electronic circuit of claim 29 wherein the flange member defines at least one recess that receives at least one of the first end, the second end, the third end, and the fourth end of the first wire and the second wire.

31. The electronic circuit of claim 30 wherein the at least one of the first end, the second end, the third end, and the fourth end of the first wire and the second wire is electrically attached to the at least a portion of the circuitry in the recess.

32. A transformer comprising:

a longitudinal core;

intertwined spiral windings configured about the longitudinal core and having a central axis substantially parallel to the longitudinal axis of the longitudinal core, wherein the intertwined spiral windings further comprise:

a first conductor configured in a first winding; and a second conductor configured in a second winding, wherein individual turns of the first winding are between individual turns of the second winding, wherein an inner diameter of the first winding is substantially equal to an inner diameter of the second winding; and a first and second end of the first conductor and a first and second end of the second conductor each configured to electrically couple the intertwined spiral windings to at least one circuit; and an encapsulating body about the intertwined spiral windings and formed of a magnetic and/or non-magnetic material, and the first end and the second end of the first conductor and the first end and the second end of the second conductor extending from the encapsulating body for electrically coupling the intertwined spiral windings to at least one circuit.

33. The transformer of claim 32 wherein a majority of the individual turns of the first winding are between individual turns of the second winding.

34. The transformer of claim 32 wherein the first winding and the second winding comprise an identical number of turns, and wherein the intertwined spiral windings comprise alternating turns of the first winding and the second winding throughout the intertwined spiral windings.

35. The transformer of claim 32 wherein the first conductor is a flat wire and the second conductor is a flat wire, the first winding comprised of the first conductor edge-wound about an axis and the second winding comprised of the second conductor edge-wound about the axis.

* * * * *